(12) United States Patent
Brack et al.

(10) Patent No.: US 7,671,165 B2
(45) Date of Patent: Mar. 2, 2010

(54) METHOD OF FORMING POLYCARBONATE

(75) Inventors: Hans-Peter Brack, Herrliberg (CH); Peter K. Davis, Niskayuna, NY (US); David Domingo Fuster, Oviedo (ES); Jorge Garcia Agudo, Murcia (ES); Gerardo Hidalgo Llinas, Cartagena (ES); Miguel Angel Salomon Cheliz, Zaragoza (ES); Ignacio Vic Fernandez, Murcia (ES); Laurus van der Wekke, Rucphen (NL); Dennis James Patrick Maria Willemse, Standdaarbuiten (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 22 days.

(21) Appl. No.: 12/122,234

(22) Filed: May 16, 2008

(65) Prior Publication Data

US 2009/0286952 A1  Nov. 19, 2009

(51) Int. Cl.
*C08G 64/00* (2006.01)
*B28B 3/20* (2006.01)
(52) U.S. Cl. .................. 528/196; 264/219; 528/198
(58) Field of Classification Search .............. 264/176.1, 264/219; 528/196, 198
See application file for complete search history.

(56) References Cited

U.S. PATENT DOCUMENTS

| | | | |
|---|---|---|---|
| 4,323,668 A | 4/1982 | Brunelle | |
| 4,452,933 A | 6/1984 | McCready | |
| 4,452,969 A | 6/1984 | McCready | |
| 5,091,591 A | 2/1992 | Cipullo | |
| 5,151,491 A | 9/1992 | Sakashita et al. | |
| 5,276,129 A | 1/1994 | Sakashita et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,291,630 B1 | 9/2001 | Konig et al. | |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B2 | 4/2003 | Brunelle et al. | |
| 6,590,068 B2 | 7/2003 | Brack et al. | |
| 6,600,004 B1 | 7/2003 | McCloskey et al. | |
| 6,620,902 B2 | 9/2003 | Shimoda et al. | |
| 6,653,434 B2 | 11/2003 | Brack et al. | |
| 6,706,846 B2 | 3/2004 | Brack et al. | |
| 6,710,156 B2 | 3/2004 | Whitney et al. | |
| 6,723,823 B2 | 4/2004 | McCloskey et al. | |
| 6,734,277 B2 | 5/2004 | Brack et al. | |
| 6,747,119 B2 | 6/2004 | Brack et al. | |
| 6,790,929 B2 | 9/2004 | Silvi et al. | |
| 2002/0128425 A1 | 9/2002 | Brack et al. | |
| 2002/0132957 A1 | 9/2002 | Brack et al. | |
| 2003/0060649 A1 | 3/2003 | Burnell et al. | |
| 2003/0120025 A1 | 6/2003 | Brack et al. | |
| 2003/0139529 A1 | 7/2003 | O'Neil et al. | |
| 2003/0149223 A1 | 8/2003 | McCloskey et al. | |
| 2003/0232957 A1 | 12/2003 | Silvi et al. | |
| 2004/0068086 A1 | 4/2004 | Day et al. | |
| 2004/0087756 A1 | 5/2004 | Ramesh et al. | |
| 2004/0138383 A1 | 7/2004 | O'Neil et al. | |
| 2004/0220352 A1 | 11/2004 | Brack et al. | |
| 2005/0234211 A1 | 10/2005 | Martinez et al. | |
| 2006/0069228 A1 | 3/2006 | McCloskey et al. | |
| 2007/0119041 A1 | 5/2007 | Mascarenas et al. | |
| 2007/0135611 A1 | 6/2007 | Brack et al. | |
| 2007/0142612 A1 | 6/2007 | Davis et al. | |
| 2007/0142618 A1 | 6/2007 | Davis et al. | |
| 2008/0004417 A1 | 1/2008 | Jansen et al. | |
| 2008/0004418 A1 | 1/2008 | Jansen et al. | |
| 2009/0088538 A1 | 4/2009 | Campman et al. | |

FOREIGN PATENT DOCUMENTS

| | | |
|---|---|---|
| JP | 5009282 A2 | 1/1993 |
| JP | 10101786 A2 | 4/1998 |
| JP | 10101787 A2 | 4/1998 |
| JP | 11302228 A2 | 11/1999 |

(Continued)

*Primary Examiner*—Terressa M Boykin
(74) *Attorney, Agent, or Firm*—Larson & Anderson, LLC

(57) ABSTRACT

A method of forming polycarbonate includes the steps of introducing a plurality of reaction components to a reactor operating under melt polymerization conditions and removing ester-substituted phenol from the reactor. The plurality of reaction components include a dihydroxy compound, an ester-substituted diaryl carbonate, and a melt transesterification catalyst. The reaction components are introduced in a plurality of reaction component streams. A first reaction component streams includes a melt transesterification catalyst dissolved or suspended in a liquid carrier containing an ester-substituted phenol. The composition of the first reaction component stream is selected such that ester-substituted phenol is not generated as a reaction product in the first reaction component stream.

29 Claims, 12 Drawing Sheets

FOREIGN PATENT DOCUMENTS

| | | |
|---|---|---|
| JP | 2000129112 A | 5/2000 |
| JP | 2002309015 A2 | 10/2002 |
| WO | 03040208 A1 | 5/2003 |
| WO | 03106149 A1 | 12/2003 |
| WO | 2005066239 A1 | 7/2005 |

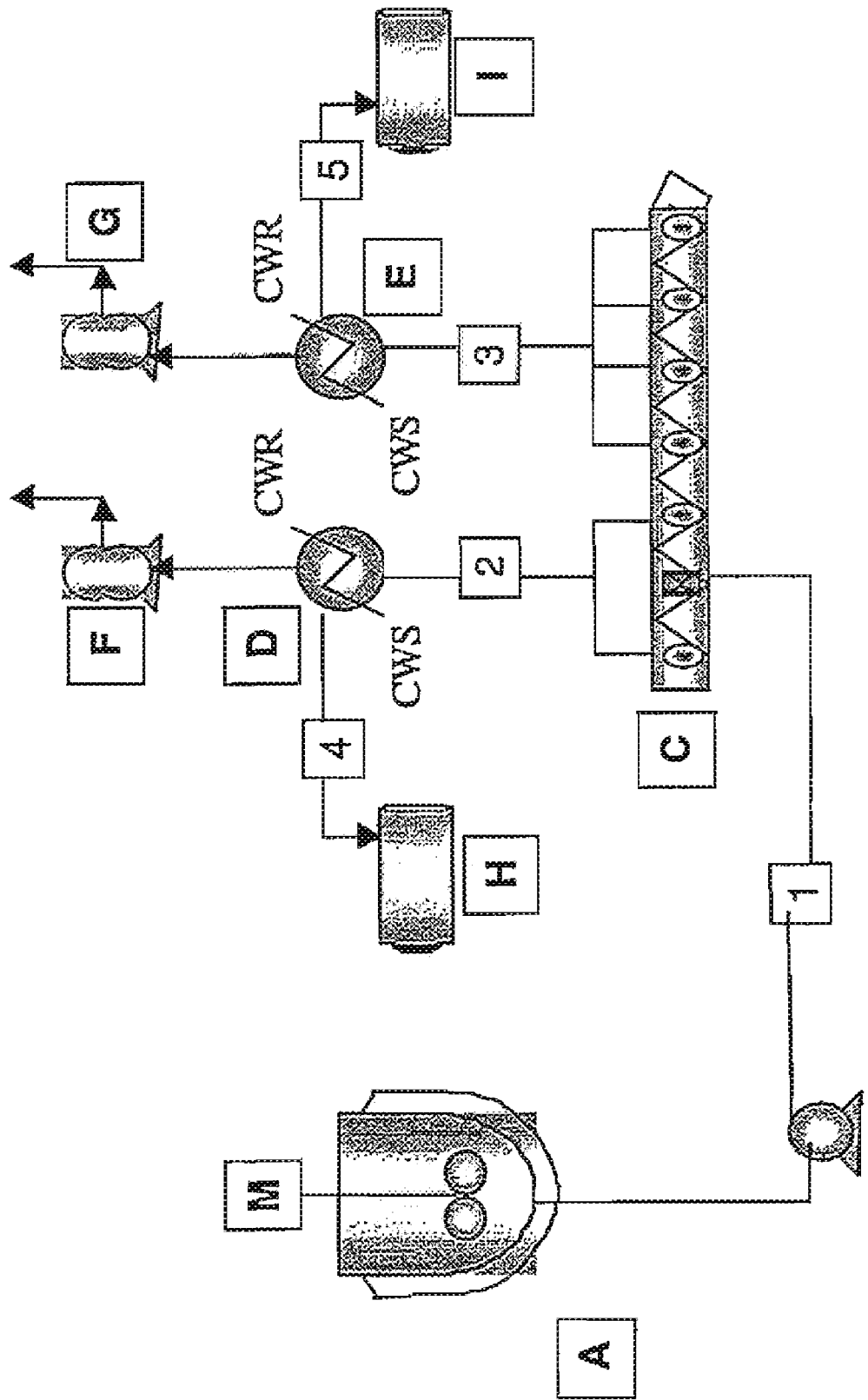
Fig. 6.1

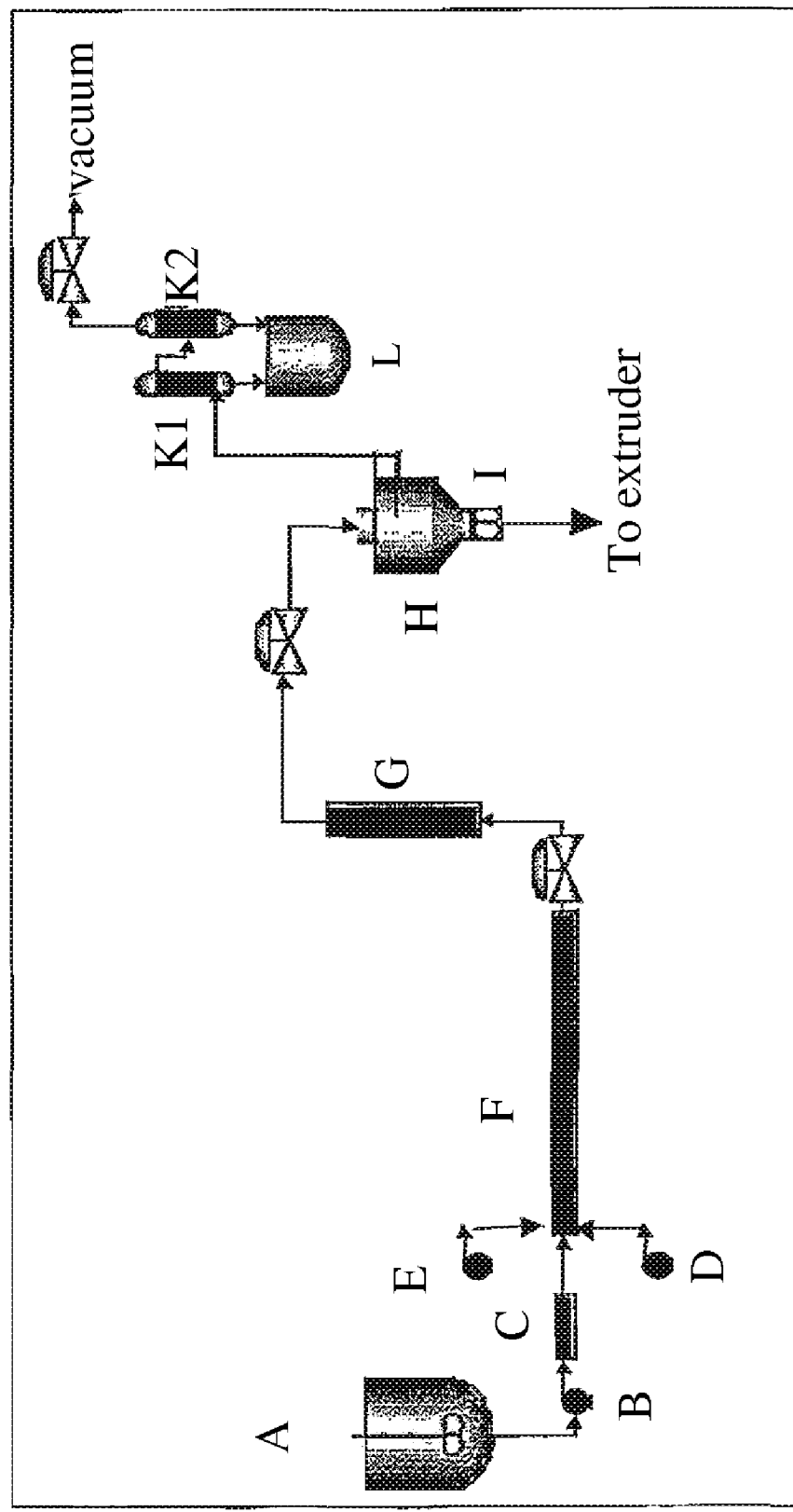
Fig. 6.2

HPLC data showing PCPS evolution over time at 200 °C.
All experiments with 4 eq NaOH unless otherwise specified.

PCP-MS model compound reactions with varying temperature, equimolar PCP/MS, and 4 eq NaOH

METHOD OF FORMING POLYCARBONATE

BACKGROUND OF INVENTION

The present invention relates to the production of polycarbonate using a melt transesterification reaction between a diaryl carbonate and a dihydroxy compound. In the melt transesterification process, dihydroxy compounds such as bisphenol A are reacted with diaryl carbonates such as diphenyl carbonate (DPC) or more preferably with ester-substituted diaryl carbonates such as bismethylsalicylcarbonate (BMSC).

U.S. Pat. No. 4,323,668, which is incorporated herein by reference, describes a polycarbonate transesterification process comprising reacting an ester-substituted diaryl carbonate and a dihydric phenol in the presence of a catalyst under transesterification reaction conditions. In the specific examples, U.S. Pat. No. 4,323,668, which is incorporated herein by reference, makes uses of bismethylsalicylcarbonate (BMSC) as the diaryl carbonate. Use of ester-substituted diaryl carbonates in the production of polycarbonate is also described in U.S. Pat. No. 6,420,512, U.S. Pat. No. 6,506,871, U.S. Pat. No. 6,548,623, U.S. Pat. No. 6,790,929, U.S. Pat. No. 6,518,391, US Application Serial No. 2003/0139529, and US Application Serial No. 2003/0149223 all of which are incorporated herein by reference.

In these patents it is discussed that the use of ester-substituted diaryl carbonate as the carbonate source allows for increased transesterification rates, when compared to processes using DPC, and superior polymer properties. However, additional improvements are still desired. For example, water is often used as a solvent for melt transesterification catalysts including sodium hydroxide. In melt transesterification reactions using DPC this is not necessarily problematic in that water is an excellent solvent and does not adversely affect the performance of the DPC. It has herein been found, that although water is an excellent solvent for melt transesterification catalysts, water readily hydrolyzes ester-substituted diaryl carbonates thereby altering the molar ratio of reaction components within the melt polymerization reaction. Furthermore, other known solvents such as benzene and other carcinogenic solvents are not desirable because of their toxicity. Additionally water and other foreign materials added to the melt polymerization reaction will likely be present within the product polycarbonate.

It would be beneficial to find a method of introducing reaction components into reaction equipment without introducing foreign materials into the reaction equipment that would hinder the formation reaction and/or be present within the product polycarbonate or in the overhead stream of the phenolic byproduct of the transesterification reaction as it exits the equipment.

SUMMARY OF INVENTION

The present inventors have found that melt transesterification catalyst can be dissolved or suspended within ester-substituted phenol to produce a free flowing mixture that can be introduced to other reaction components and dispersed within a melt polymerization reaction mixture in a polymerization reactor(s). Using an ester-substituted phenol as a solvent and/or carrier liquid for these materials has been found to have many distinct and real world benefits.

First and foremost, ester-substituted phenol is a native material to melt transesterification reactions in that it is a byproduct created in the reaction between an ester-substituted diaryl carbonate and a dihydroxy compound. The ester-substituted phenol is removed from the reaction equipment, usually as a vapor, to drive the melt reaction forward to build molecular weight and produce polycarbonate. By dissolving or suspending melt polymerization catalysts in an ester-substituted phenol, one can create a free flowing mixture that can be easily transferred throughout a melt polycarbonate production facility and introduced into melt transesterification reaction equipment. Furthermore, one can easily measure and/or meter the introduction of the catalyst, within the mixture, into the reaction equipment to create desired stoichiometric conditions.

By using an ester-substituted phenol as a solvent and/or carrier liquid versus known solvents and carrier liquids (e.g. toluene, benzene, or water) one can produce polycarbonate without the risk of introducing foreign contaminants to the mixture that could hinder the reaction kinetics, create separation problems in downstream processes, and/or create undesired properties within the product polycarbonate. For example as described above water, which has been used as a solvent or carrier liquid to transfer a reaction component (e.g. catalyst) into a melt polymerization reactor using an ester-substituted diaryl carbonate, has been found to react with and degrade the ester-substituted diaryl carbonate prior to reacting with the other reaction components. This negatively impacts the melt polymerization reaction in that the molar ratio of reaction components (diaryl carbonate/dihydroxy) is adversely altered prior to or during the melt polymerization reaction.

Furthermore, by using a non-hazardous ester-substituted phenol (e.g. methyl salicylate) as compared to a hazardous organic compound such as toluene or benzene as a solvent or carrier liquid one can minimize potential safety issues at the outset. In a first embodiment a method of forming polycarbonate is provided. The method comprises the steps of:

(I) introducing a plurality of reaction components to a reactor operating under melt polymerization conditions, the plurality of reaction components comprising a dihydroxy compound, an ester-substituted diaryl carbonate, and a melt transesterification catalyst, wherein:
  the reaction components are introduced in a plurality of reaction component streams,
  a first reaction component streams comprises a melt transesterification catalyst dissolved or suspended in a liquid carrier comprising an ester-substituted phenol, wherein the composition of the first reaction component stream is selected such that ester-substituted phenol is not generated as a reaction product in the first reaction component stream, and (II) removing ester-substituted phenol from the reactor, thereby allowing the reaction components to react to form polycarbonate.

The present inventors have also found that an ester-substituted phenol is a preferable carrier liquid for the introduction of additives and/or other reaction components into the melt polymerization reaction system or to the resulting polycarbonate. The "other" reaction components include dihydroxy compounds and ester-substituted diaryl carbonates while the additives include those added to the reaction mixture and/or polycarbonate to produce desirable properties such as branching, end-capping, and impact resistance, inter alia. Therefore, in another embodiment a further method of forming polycarbonate is provided. The method comprises the steps of:

(I) introducing a plurality of reaction components to a reactor operating under melt polymerization conditions, the plurality of reaction components comprising a dihydroxy compound, an ester-substituted diaryl carbonate, and a melt transesterification catalyst, wherein:

the reaction components are introduced in a plurality of reaction component streams, a first reaction component streams comprises an ester-substituted diaryl carbonate, a dihydroxy compound, or both an ester-substituted diaryl carbonate and a dihydroxy compound dissolved or suspended in a carrier liquid comprising an ester-substituted phenol, wherein the composition of the first reaction component stream is selected such that ester-substituted phenol is not generated as a reaction product in the first reaction component stream, and (II) removing ester-substituted phenol from the reactor, thereby allowing the reaction components to react to form polycarbonate.

In another embodiment a further method of forming polycarbonate is provided. The method comprises the steps of:

(I) introducing a plurality of reaction components to a reactor operating under melt polymerization conditions, the plurality of reaction components comprising a dihydroxy compound, an ester-substituted diaryl carbonate, and a melt transesterification catalyst, (II) introducing an additive stream to the plurality of reaction components in the reactor, wherein the additive stream comprises an additive dissolved or suspended in an ester-substituted phenol, and (III) removing ester-substituted phenol from the reactor, thereby allowing the reaction components to react to form polycarbonate.

BRIEF DESCRIPTION OF DRAWINGS

FIGS. 6.1 and 6.2 show reaction system configurations used in the example section.

DETAILED DESCRIPTION OF INVENTION

Figure 1:
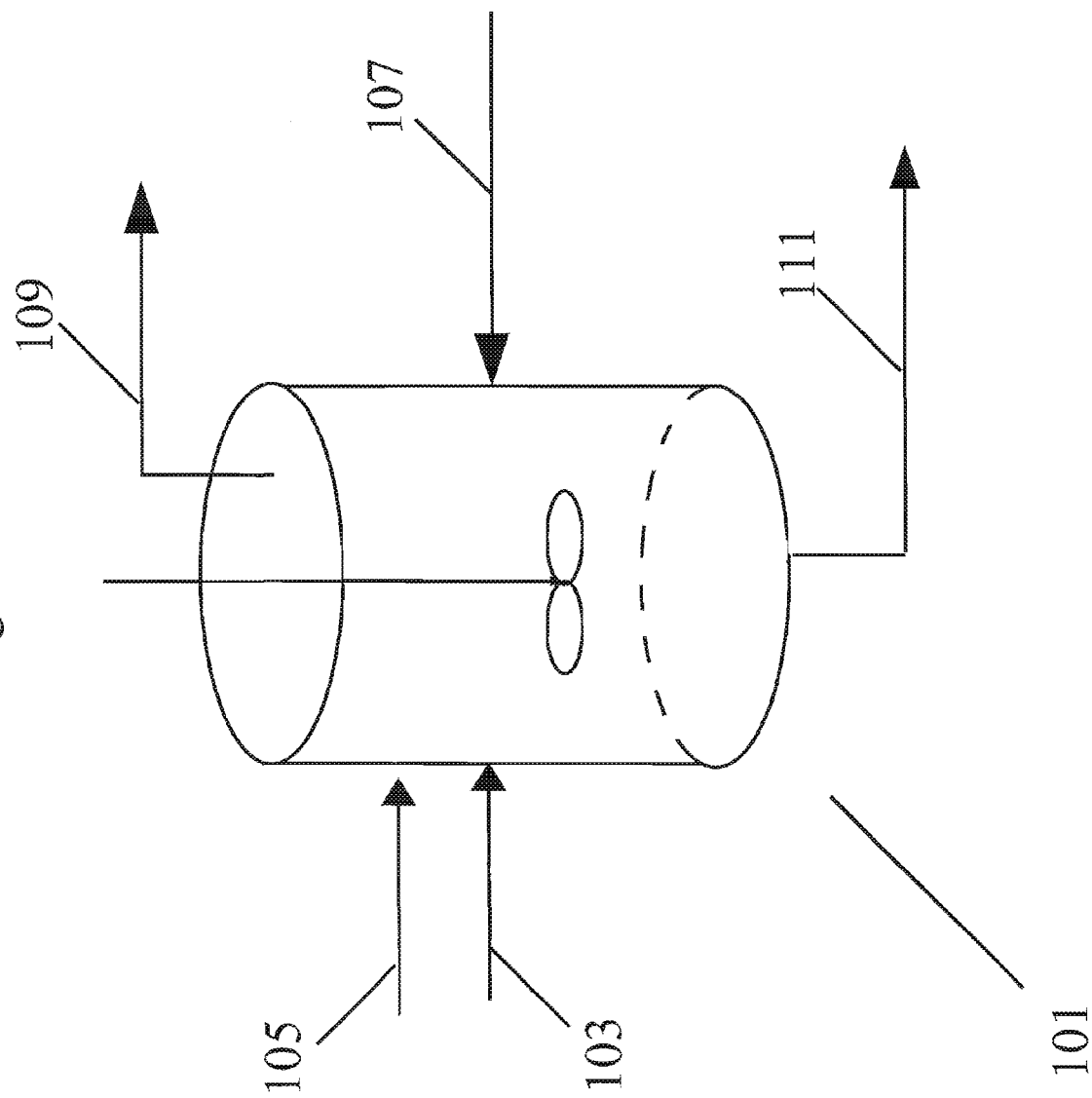
FIGS. 1-5 are schematic diagram illustrating reaction system configurations in accordance with the present invention.

The present invention may be understood more readily by reference to the following detailed description of preferred embodiments of the invention and the examples included herein. As described above, the present inventors have found that melt transesterification catalyst can be dissolved or suspended in a carrier liquid comprising an ester-substituted phenol to produce a free flowing catalyst mixture that can be introduced to a melt polymerization reaction system. Using an ester-substituted phenol as a solvent and/or carrier liquid for these materials has been found to have many distinct and real world benefits as described above, which is herein incorporated by reference thereto into this section.

In a first embodiment a method of forming polycarbonate is provided. The method comprises the steps of:

(I) introducing a plurality of reaction components to a reactor operating under melt polymerization conditions, the plurality of reaction components comprising a dihydroxy compound, an ester-substituted diaryl carbonate, and a melt transesterification catalyst, wherein:

the reaction components are introduced in a plurality of reaction component streams, a first reaction component streams comprises a melt transesterification catalyst dissolved or suspended in a liquid carrier comprising an ester-substituted phenol, wherein the composition of the first reaction component stream is selected such that ester-substituted phenol is not generated as a reaction product in the first reaction component stream, and (II) removing ester-substituted phenol from the reactor, thereby allowing the reaction components to react to form polycarbonate.

The present inventors have also found that an ester-substituted phenol is also a preferable carrier liquid for the introduction of additives and/or other reaction components into the melt polymerization reaction system. The "other" reaction components include dihydroxy compound and ester-substituted diaryl carbonate while the additives include those added to the reaction mixture or product polycarbonate to produce desirable properties such as branching, end-capping, and impact resistance, inter alia. Therefore, in another embodiment a further method of forming polycarbonate is provided. The method comprises the steps of:

(I) introducing a plurality of reaction components to a reactor operating under melt polymerization conditions, the plurality of reaction components comprising a dihydroxy compound, an ester-substituted diaryl carbonate, and a melt transesterification catalyst, wherein:

the reaction components are introduced in a plurality of reaction component streams, a first reaction component streams comprises an ester-substituted diaryl carbonate, a dihydroxy compound, or both an ester-substituted diaryl carbonate and a dihydroxy compound dissolved or suspended in a carrier liquid comprising an ester-substituted phenol, wherein the composition of the first reaction component stream is selected such that ester-substituted phenol is not generated as a reaction product in the first reaction component stream, and (II) removing ester-substituted phenol from the reactor, thereby allowing the reaction components to react to form polycarbonate.

In another embodiment a further method of forming polycarbonate is provided. The method comprises the steps of:

(I) introducing a plurality of reaction components to a reactor operating under melt polymerization conditions, the plurality of reaction components comprising a dihydroxy compound, an ester-substituted diaryl carbonate, and a melt transesterification catalyst, (II) introducing a reaction agent additive stream to the plurality of reaction components in the reactor, wherein the reaction agent additive stream comprises a reaction agent additive dissolved or suspended in an ester-substituted phenol, and (III) removing ester-substituted phenol from the reactor, thereby allowing the reaction components to react to form polycarbonate.

The methods provided by the present invention may be practiced separately or they may be practiced together. For example in one embodiment, where some of the methods are practiced together, a melt polymerization catalyst is introduced to a polymerization reactor system in a first reaction component stream while either or both of an ester-substituted diaryl carbonate and/or a dihydroxy compound is introduced in a second reaction component stream. Both the first and the second reaction component stream comprise a carrier liquid comprising an ester-substituted phenol. Further to this embodiment it may be desirable to add a reaction agent additive stream comprising a reaction agent additive dissolved or suspended in an ester-substituted phenol to the reaction components in the reactor system. In one embodiment, a processing agent additive stream may be added to and blended with the polycarbonate produced in any of the above embodiments, where the processing agent is dissolved or suspended in an ester-substituted phenol.

DEFINITIONS

As used in the specification and claims of this application, the following definitions, should be applied.

"a", "an", and "the" as an antecedent refer to either the singular or plural. For example, "an aromatic dihydroxy compound" refers to either a single species of compound or a mixture of such species unless the context indicates otherwise.

"polycarbonate" refers to an oligomer or polymer comprising residues of at least one monomer compound (e.g. dihydroxy compound) joined by carbonate linkages. In certain embodiments of the invention, the polycarbonate comprises residues of an aromatic dihydroxy compound and has a number average molecular weight, Mn, measured relative to polystyrene (PS) standards of between 10,000 g/mol and 160,000 g/mol. In specific embodiments, the Mn measured relative to PS is between 13,000 g/mol and 160,000 g/mol, for example between 15,000 g/mol and 160,000 g/mol. In another embodiment, the Mn (PS) is between 15,000 g/mol and 102,000 g/mol. The term "polycarbonate" encompasses poly(carbonate-coester) oligomers and polymers. Nothing in the description and claims of this application should be taken as limiting the polycarbonate to only one monomer residue unless the context is expressly limiting. Thus, the application encompasses copolycarbonates with residues of 2, 3, 4, or more types of monomer compounds.

"Oligomer" refers to polycarbonate polymers having from 2 to 40 repeat units derived from dihydroxy compound(s).

The term "carrier liquid" as it is used to described the ester-substituted phenol containing stream is herein understood to mean that the carrier liquid is present in an amount sufficient to transfer the selected reaction component(s) and/or additive(s) in a free flowing mixture. One or more reaction components and/or additives are dissolved, suspended, or both dissolved and suspended in the ester-substituted phenol containing carrier liquid. One or more additional compounds or liquids (e.g. sometimes called "co-solvents") may be present with the ester-substituted phenol in the carrier liquid, and/or the temperature of the carrier liquid may be adjusted to a temperature, such that the reaction component(s) and/or additives are fully dissolved in the carrier liquid. In a preferred embodiment the make up, the temperature, and the amount of the carrier liquid stream is sufficient to completely dissolve the reaction component(s) and/or additives are fully dissolved in the carrier liquid.

The term "suspended" as it is used to described a reaction component or additive within the carrier liquid is herein understood to mean that the component or agent is not dissolved but is present therein in dispersed suspension. In a preferred embodiment the component and/or additive is stably suspended in the carrier liquid such that it stays in suspension for a long time period as compared to the time period of the reaction process. In another embodiment the component and/or additive is temporarily suspended in the carrier liquid such that after it is suspended in the carrier liquid (e.g. by vigorous mixing) it can be transferred to the reaction components without settling out of mixture and clogging transfer lines or mixing equipment.

The term "reaction components" is herein understood to mean the materials used to effect a melt transesterification reaction between a dihydroxy compound and an ester-substituted diaryl carbonate to produce polycarbonate. These materials include an ester-substituted diaryl carbonate, a dihydroxy compound, and a melt transesterification catalyst.

The term "additive" is herein understood to mean materials that are optionally added to the reaction components or reaction mixture prior to or during the melt transesterification reaction to form the polycarbonate. These agents can be, for example, compounds that react directly with the polymer chain (i.e. branching agents and end-capping agents, inter alia) or other compounds that effect the final properties of the polycarbonate such as antioxidants and the like.

The term "monomer compound" and "dihydroxy compound" are used interchangeably herein. The product polycarbonate will comprise repeat units derived from dihydroxy compounds.

Numerical values in the specification and claims of this application, particularly as they relate to polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement techniques of the type described in the present application to determine the value.

The Ester-Substituted Diaryl Carbonate:

In the present invention, ester-substituted diaryl carbonates react with dihydroxy compounds to form carbonate linkages during the melt production of polycarbonate. Preferred ester-substituted diaryl carbonates have the structure:

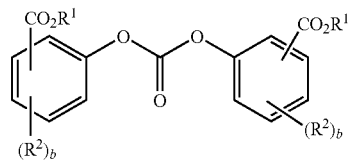

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer 0-4. At least one of the substituents $CO_2R^1$ is preferably attached in an ortho position relative to the carbonate group.

Examples of preferred ester-substituted diaryl carbonates include but are not limited to bismethylsalicylcarbonate (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically bismethylsalicylcarbonate (BMSC) is preferred for use in melt polycarbonate synthesis due to its lower molecular weight and higher vapor pressure.

The theoretical stoichiometry of the reaction within the melt polymerization reaction mixture requires a molar ratio of dihydroxy composition to diaryl carbonate composition of 1:1. However, in practicing the present invention the molar ratio in the melt reaction mixture is suitably between 0.25:1 to 3:1, more preferably 1:0.95 to 1:1.05 and more preferably 1:0.98 to 1:1.02.

The Dihydroxy Compound:

The dihydroxy compound is not limited to aromatic dihydroxy compounds. It is contemplated that the dihydroxy compound comprises aliphatic diols and/or acids. The following is a non-limiting list of such dihydroxy compounds:

Aliphatic Diols:

Isosorbide:1,4:3,6-dianhydro-D-sorbitol, Tricyclodecanedimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is frequently preferred that the dihydroxy compound comprise a dihydroxy aromatic compound. The relative amounts of individual dihydroxy compounds are selected based on the desired composition of the product polycarbonate. A preferred dihydroxy aromatic composition of the present invention is bisphenol A (BPA). However, other dihydroxy aromatic compounds of the present invention can be used and are selected from the group consisting of bisphenols having structure,

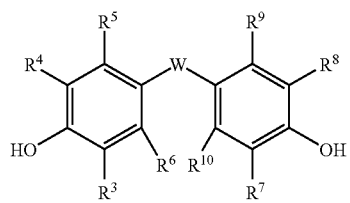

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group

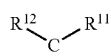

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having structure

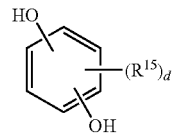

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures,

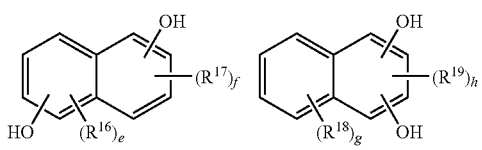

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5- methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, and 1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene.

Suitable dihydroxy naphthalenes are illustrated by 1,4-dihydroxy naphthalene; 1,4-dihydroxy-2-methyl naphthalene; 1,4-dihydroxy-2-phenyl naphthalene and 1,3-dihydroxy naphthalene.

The Melt Transesterification Catalyst:

The melt transesterification catalyst system used in the methods of the present invention comprises a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The quaternary ammonium compound is selected from the group of organic ammonium compounds having structure,

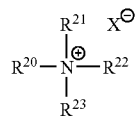

wherein $R^{20}$-$R^{23}$ are independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

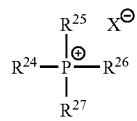

wherein $R^{24}$-$R^{27}$ are independently a $C^1$-$C^{20}$ alkyl radical, $C^4$-$C^{20}$ cycloalkyl radical, or a $C_4$-$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in the quaternary ammonium and phosphonium structures are properly balanced. For example, where $R^{20}$-$R^{23}$ are each methyl groups and $X^-$ is carbonate, it is understood that $X^-$ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred. Further sodium hydroxide is often contained within the reaction components as an impurity and is contained in such an amount to catalyze the reaction without the addition of additional catalysts.

In order to achieve the formation of polycarbonate using the method of the present invention an effective amount of catalyst must be employed. The amount of catalyst employed is typically based upon the total number of moles of dihydroxy compounds employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1 \times 10^{-2}$ and $1 \times 10^{-6}$, preferably between $1 \times 10^{-4}$ and $1 \times 10^{-5}$ moles per mole of the first and second dihydroxy compounds combined. The inorganic metal hydroxide catalyst typically will be used in an amount corresponding to between $1 \times 10^{-4}$ and $1 \times 10^{-8}$, preferably $1 \times 10^{-4}$ and $1 \times 10^{-7}$ moles of metal hydroxide per mole of the first and second dihydroxy compounds combined.

In another catalyst system according to the method of the present invention, an alkali metal may be employed. As discussed above, preferable alkali metals are illustrated by sodium, lithium, and potassium. Due to its relatively low cost, sodium is often preferred.

Reaction Agent and Processing Agent Additives:

As described above a "reaction agent additive" may be introduced to the reaction components in the polymerization reactor system. The reaction agent additive is added in a reaction agent additive stream comprising the reaction agent additive dissolved or suspended in an ester-substituted phenol. The reaction agent additive is not particularly limited and can be any known additive that is used in polymerization reactions to effect the properties of the resulting polycarbonate or the reaction conditions within the reactor system. For example these reaction agent additive s include, inter alia, antioxidants, branching agents, and end-capping agents.

In another embodiment a "processing agent" additive may be introduced to and blended with the polycarbonate produced by any of the methods described in the present invention in a processing agent additive stream comprising the processing agent dissolved or suspended in an ester-substituted phenol containing carrier liquid. The processing agent is not particularly limited other than it is preferably added to the polycarbonate to effect the resulting properties of the polycarbonate. Such processing agents include, among many others, impact modifiers, colorants, mold release agents, fire retardants, and UV stabilizers. The processing agent stream is then blended with the polycarbonate to disperse the processing agent throughout the polycarbonate. The method of blending is not limited and can occur via any known method of mixing polymer and processing agent.

The Ester-Substituted Phenol Containing Carrier Liquid

As a melt reaction proceeds using an ester-substituted diaryl carbonate and dihydroxy compound to form polycarbonate, the ester-substituted diaryl carbonate is consumed and an ester-substituted phenol byproduct is generated. The phenolic byproduct is typically removed from reaction system to drive the polymerization reaction toward higher conversion. The structure of the generated phenolic byproduct will depend on what diaryl carbonate is employed as the carbonate source. For example, if bismethylsalicylcarbonate (BMSC) is employed, a typical phenolic byproduct will be an ester-substituted phenol such as methyl salicylate.

In the present invention a reaction component, processing agent additive, and/or a reaction agent additive is introduced to a melt polymerization reaction system or to the product polycarbonate. The reaction component and/or additives are dissolved or suspended in a carrier liquid comprising an ester-substituted phenol. In a preferred embodiment the ester-substituted phenol selected will correspond to the degradation product of the ester-substituted diaryl carbonate selected as the carbonate source for the transesterification reaction. For example, as illustrated above, if BMSC is employed, a typical phenolic byproduct will be methyl salicylate (MS) where MS would be a preferred carrier liquid. By employing this approach down stream efficiencies can be achieved by eliminating the need to separate the ester-substituted phenol degradation product from the ester-substituted phenol carrier liquid prior to a later reformation reaction that produces, or reproduces, the ester-substituted diaryl carbonate. However, the step of matching the carrier liquid to the phenolic byproduct is not required.

The ester-substituted phenol has the structure,

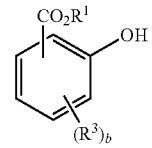

wherein $R^1$ is a $C_1$-$C_{20}$ alkyl group, $C_4$-$C_{20}$ cycloalkyl group, or $C_4$-$C_{20}$ aryl group; $R^2$ is independently at each occurrence a halogen atom, cyano group, nitro group, $C_1$-$C_{20}$ alkyl group, $C_4$-$C_{20}$ cycloalkyl group, $C_4$-$C_{20}$ aryl group, $C_4$-$C_{20}$ alkoxy group, $C_4$-$C_{20}$ cycloalkoxy group, $C_4$-$C_{20}$ aryloxy group, $C_1$-$C_{20}$ alkylthio group, $C_4$-$C_{20}$ cycloalkylthio group, $C_4$-$C_{20}$ arylthio group, $C_1$-$C_{20}$ alkylsulfinyl group, $C_4$-$C_{20}$ cycloalkylsulfinyl group, $C_4$-$C_{20}$ arylsulfinyl group, $C_1$-$C_{20}$ alkylsulfonyl group, $C_4$-$C_{20}$ cycloalkylsulfonyl group, $C_4$-$C_{20}$ arylsulfonyl group, $C_1$-$C_{20}$ alkoxycarbonyl group, $C_4$-$C_{20}$ cycloalkoxycarbonyl group, $C_4$-$C_{20}$ aryloxycarbonyl group, $C_2$-$C_{60}$ alkylamino group, $C_6$-$C_{60}$ cycloalkylamino group, $C_5$-$C_{60}$ arylamino group, $C_1$-$C_{40}$ alkylaminocarbonyl group, $C_4$-$C_{40}$ cycloalkylaminocarbonyl group, $C_4$-$C_{40}$ arylaminocarbonyl group, or $C_1$-$C_{20}$ acylamino group; and b is an integer 0-4.

Examples of suitable ester-substituted phenols include methyl salicylate, ethyl salicylate, propyl salicylate, butyl salicylate, 4-chloro methyl salicylate, n-propyl salicylate, benzyl salicylate and mixtures thereof. Typically, methyl salicylate is preferred as BMSC is frequently preferred as a carbonate source for melt polycarbonate production.

The ester-substituted phenol carrier liquid may be a "pure" product (i.e. a product of a process whose primary purpose is production of the ester-substituted phenol) or it may be a by-product stream from the polymerization reaction. Since the ester-substituted phenol is a by-product from a melt reaction using an ester-substituted diaryl carbonate, it is often preferred that it be collected, recycled, and used as the solvent/carrier liquid for the methods and processes described herein.

In preferred embodiments the carrier liquid is made up of and/or consists essentially of ester-substituted phenol. In some other embodiments the carrier liquid may further comprise a polar co-solvent. In these later embodiments the presence of the polar co-solvent, has been found to help dissolve, or to completely dissolve the reaction component (e.g. catalyst) or additive in the carrier liquid. The amount of polar co-solvent used depends upon the selected primary ester-substituted phenol solvent/carrier liquid and the selected reaction component and/or processing agent or reaction agent additive. To aid in dissolving the reaction components, it has been found that the carrier liquid further comprise the polar co-solvent in a weight ratio of 0.1 to 50.0 wt % polar co-solvent to 50.0 to 99.9 wt % ester-substituted phenol primary solvent/carrier liquid. In other embodiments, it has been found that the carrier liquid comprise the polar co-solvent in a weight ratio of between 0.5 to 20.0 wt % polar co-solvent to 80.0 to 99.5 wt % ester-substituted phenol, more preferably 1.0 to 10.0 wt % polar co-solvent to 90.0 to 99.0 wt % ester-substituted phenol, and most preferably 1.0 to 5.0 wt % polar co-solvent to 90.0 to 95.0 wt % ester-substituted phenol.

The co-solvent is a polar solvent that does not contain water and is miscible with the selected primary ester-substituted phenol of the carrier liquid. The co-solvent may be either a "protic" or an "aprotic" co-solvent. Preferably the co-solvent will have a boiling point between 50° C. and 220° C., for example between 55° C. and 200° C., and more preferably between 60° C. and 190° C. The boiling point of the co-solvent is preferably selected to be below the boiling point of the ester-substituted phenol used in the carrier liquid to ensure that it can be removed from the reaction system with the ester-substituted phenol primary carrier liquid/solvent. Furthermore, the co-solvent is preferably thermally stable such that it does not degrade to form degradation products that would hinder properties of the resulting polycarbonate.

Where the co-solvent is a "protic" solvent it is preferably less capable of donating a proton than water is. Preferred polar protic co-solvents include low molecular weight alkyl alcohols and organic acids such as methanol, ethanol, formic acid, and acetic acid. In a particularly preferred embodiment where the co-solvent is a polar protic co-solvent, it is methanol. Since many of the polar protic co-solvents can also used as end-capping agents, the presence of the polar aprotic co-solvent should not negatively skew the end-capping of the formed polycarbonate and quench the transesterification reaction. An increase in end-capping can effect polymer properties such as molecular weight build and color.

In preferred embodiments where the reaction mixture comprises an excess ratio of dihydroxy compounds to diaryl carbonate compounds, the amount of polar protic co-solvent added will cause less than 3.0 mole % end-capping by product, more preferably less than 2.5 mol %, less than 2.0, less than 1.0 mole %, and most preferably less than 0.5 mole % end-capping byproduct. In other embodiments where there is an excess ratio of diaryl carbonate to dihydroxy aromatic compounds in the reaction mixture, the effect of the chain-stopping byproduct is more pronounced at lower mole %. In this later embodiment where the reaction mixture comprises an excess ratio of diaryl carbonate to dihydroxy aromatic compounds it is preferred that the presence of the polar protic co-solvent cause no more than 0.5 mole %, more preferably less than 0.3 mole %, less than 0.2 mole %, and most preferably less than 0.1 mole % end-capping byproduct.

The co-solvent may also be a polar aprotic solvent. In this case the polar aprotic co-solvent is an organic co-solvent that does not exchange protons with the dissolved or suspended reaction component and/or additive. Exemplary polar aprotic co-solvents include dimethyl sulfoxide (DMSO), Tetrahydrofuran (THF), and acetonitrile.

In the embodiments where a co-solvent is employed (e.g. to aid in the dissolution of the reaction component (e.g. catalyst) or additive in the carrier liquid) the resulting polycarbonate will likely contain a residual amount of the polar co-solvent. As demonstrated in the example section, the resulting polycarbonate prepared using a co-solvent as described herein will contain distinct and detectable indicia of the presence of the polar co-solvent using a 400 MHz $^1$H-NMR.

The Processes:

The present inventors have found that reaction components and/or additives can be dissolved or suspended in an ester-substituted phenol to produce a free flowing mixture. Using an ester-substituted phenol as a carrier liquid for these materials has been found to have many distinct and real world benefits described above and incorporated into this section by reference thereto.

The methods of the present invention include introducing a plurality of reaction components into a reactor operating under melt polymerization conditions. The plurality of reaction components include a dihydroxy compound, an ester-substituted diaryl carbonate, and a melt transesterification catalyst, as described above. Ester-substituted phenol is removed from the reactor to drive the reaction forward toward producing higher molecular weight polycarbonate.

The term "reactor" as it is used to describe the equipment reaction components and additives are introduced into is herein understood to mean a reaction system having a single reactor or a plurality of reactors where reaction components are brought together to achieve a melt transesterification reaction between the ester-substituted diaryl carbonate and the free hydroxy groups of the dihydroxy compound. The reaction system and the conditions under which it is operated are not particularly limited other than the reactor or reactors are operating under melt polymerization conditions to produce polycarbonate and ester-substituted phenol is removed from the reaction system to drive the polymerization reaction toward the production of polycarbonate.

The reactor configurations, including a plug flow reactor and the operating conditions, described in U.S. patent application Ser. No. 11/863,723, which is herein incorporated by reference, have been found to be preferable for the use of producing polycarbonate. However, the reaction system may also comprise an extruder as such is disclosed in U.S. patent application Ser. Nos. 11/275,266 and 11/470,333, which are incorporated herein by reference. In another embodiment the reaction system further comprises an oligomerization reactor (e.g. a stirred tank reactor) where reaction components are introduced to produce a reaction mixture comprising polycarbonate oligomers prior to later polymerization reactions in subsequent reactors.

In a preferred embodiment, as depicted in FIG. 1, a method of forming polycarbonate is provided wherein the plurality of reaction components are introduced to a reactor 101, or reaction system, as described above in a plurality of reaction component streams 103, 105. In one embodiment a first reaction component streams 103 comprises a melt transesterification catalyst dissolved or suspended in a carrier liquid comprising an ester-substituted phenol. In another embodiment the first of the reaction component streams 103 comprises an ester-substituted diaryl carbonate, a dihydroxy compound, or both an ester-substituted diaryl carbonate and a dihydroxy compound dissolved or suspended in a carrier liquid comprising an ester-substituted phenol.

The reaction components present in the first reaction component stream 103 are selected such that ester-substituted phenol is not generated as a reaction product in the first reaction component stream 103. As described above, ester-substituted phenol is a reaction product (or byproduct) obtained by a melt reaction of a dihydroxy compound with a diaryl carbonate in the presence of the a melt transesterification catalyst. The phrase "not generated as reaction product" means that the reaction components present in the first reaction component stream 103 are selected such that a melt transesterification reaction does not occur to produce a measurable quantity of ester-substituted phenol in the component stream. To achieve this end one or two of the three reaction components may be present in the first reaction component stream 103 but the third reaction component is not. For example, any one or two of the ester-substituted diaryl carbonate, the dihydroxy compound, or the melt transesterification catalyst may be present in the stream.

Where the first reaction component stream 103 comprises both an ester-substituted diaryl carbonate and a dihydroxy compound these compounds may peripherally react, due to their mere presence, to produce a peripheral amount of ester-substituted phenol. This peripheral amount of ester-substituted phenol is not considered to be a "a reaction product" within the scope of the claims.

In one embodiment, the reaction component in the first reaction component stream 103 comprises a melt transesterification catalyst. Preferably the first reaction component stream comprises between 0.0001 and 3.0000 wt. % catalyst and between 97.0000 wt. % and 99.9999 wt. % ester-substituted phenol. In other cases the first reaction component stream comprises between 0.001 and 2.500 wt. % catalyst, for example between 0.01 and 2.00 wt % catalyst, and sometimes in most preferable cases less than 0.50 weight % catalyst. In some other cases, it may be preferred that the catalyst is completely dissolved within the first reaction component stream 103. In one embodiment, to achieve this end it has been found that the first reaction component stream may further comprise a polar co-solvent, as is described above, that is present in an amount to ensure that the melt transesterification catalyst is dissolved in the first reaction component stream.

In the present embodiment where the first reaction component stream 103 comprises a melt transesterification catalyst, the stream 103 may further comprise either a dihydroxy compound or an ester-substituted diaryl carbonate, but not both. Where the first reaction component stream 103 further comprises a dihydroxy compound, the first reaction component stream 103 comprises between 0.0001 and 3.0000 wt. % catalyst, between 1.0000 and 10.0000 wt. % dihydroxy compound, and between 87.0000 and 98.9999 wt. % ester-substituted phenol. Wherein the first reaction component stream 103 further comprises an ester-substituted diaryl carbonate, the first reaction component stream 103 comprises between 0.0001 and 3.0000 wt. % catalyst, between 1.0000 and 50.0000 wt. % ester-substituted diaryl carbonate, and between 47.0000 and 98.9999 wt. % ester-substituted phenol.

In another embodiment, the reaction component in the first reaction component stream 103 comprises a dihydroxy compound. Preferably the composition of the first reaction component stream 103 comprises between 1.0 wt. % and 10.0 wt. % dihydroxy compound and between 90.0 wt. % and 99.0 wt. % ester-substituted phenol.

This stream 103 (e.g. containing a dihydroxy compound) may further comprise an ester-substituted diaryl carbonate. Preferably the first reaction component stream 103 comprises between 1.0 wt. % and 10.0 wt. % dihydroxy compound, between 1.0 and 50.0 wt. % ester-substituted diaryl carbonate, and between 40.0 wt. % and 98.0 wt. % ester-substituted phenol.

In yet another embodiment the reaction component in the first reaction component stream 103 comprises an ester-substituted diaryl carbonate. In this embodiment, the first reaction component stream 103 preferably comprises between 1.0 and 50.0 wt. % ester-substituted diaryl carbonate, and between 50.0 wt. % and 99.0 wt. % ester-substituted phenol.

In still a further embodiment, a second reaction component streams 105 comprises at least one reaction component dissolved or suspended in a carrier liquid comprising an ester-substituted phenol. The reaction components present in the second reaction component stream 105 are selected such that ester-substituted phenol is not generated as a reaction product in the second reaction component stream. The composition of the second reaction component stream 105 can be similar to the compositions described above with regard to the first reaction component stream 103. In a preferred embodiment the dihydroxy compound or the ester-substituted diaryl carbonate is introduced to the reaction system 101 in the first reaction component stream 103 while the catalyst and the other of the dihydroxy compound or the ester-substituted diaryl carbonate are introduced to the reaction system 101 via the second reaction component stream 105. In a further preferred embodiment, the catalyst is added to the reactor system in stream 103 while the dihydroxy compound and the diaryl carbonate are added in a second stream 105. In a most preferred embodiment a third reaction component stream 107 is provided and each of the reaction components are introduced to the reactor in their own reaction component stream.

Figure 2:
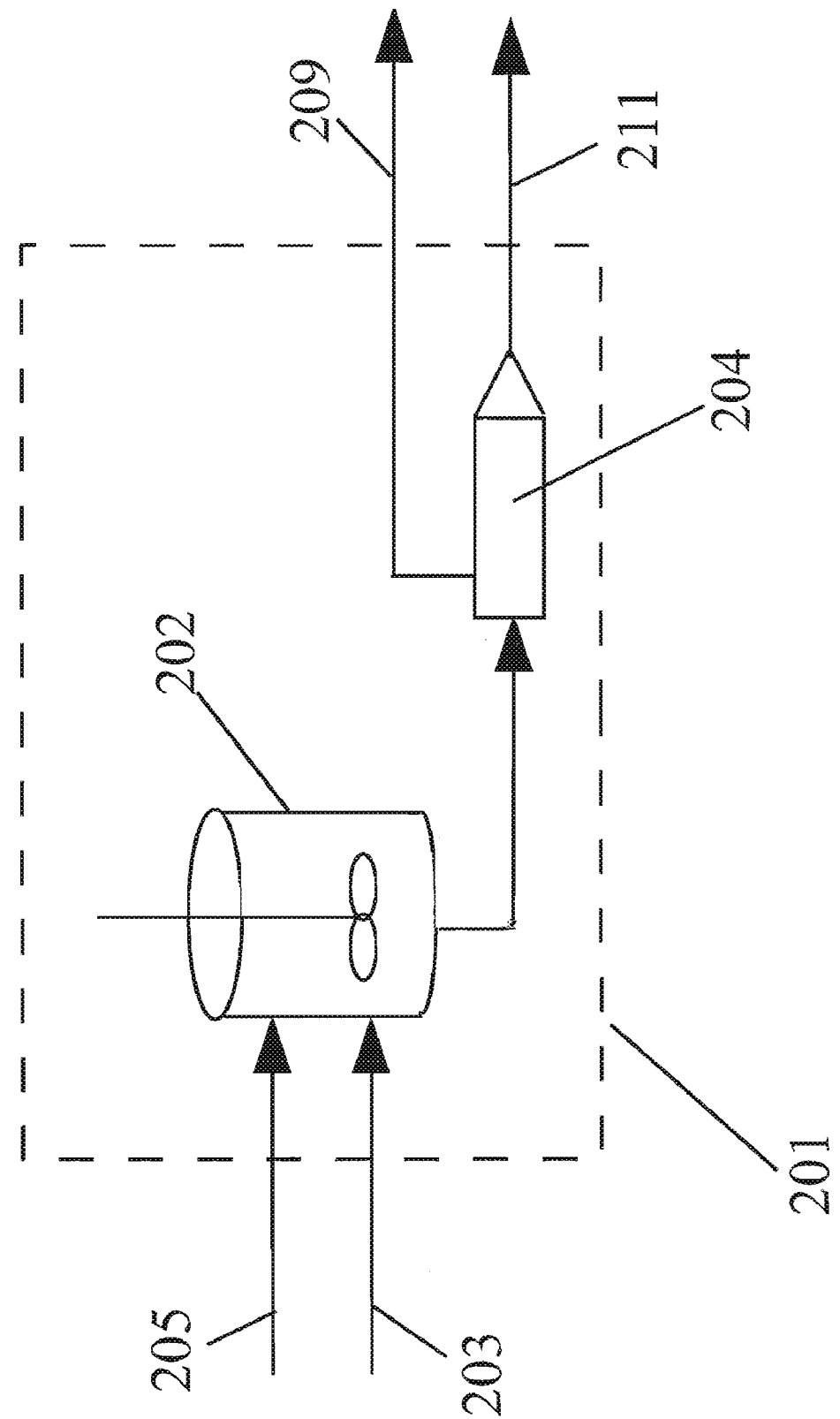

As described above the reactor 101, or reaction system, is maintained under melt transesterification conditions. Ester-substituted phenol is remove via by-product stream 109 while product polycarbonate is removed via line 111. The product polycarbonate in line 111 may be introduced to further polymerization reactors in the reaction system to further build molecular weight and/or remove ester-substituted phenol. In this later embodiment as depicted in FIG. 2, the reaction system 201 comprises an oligomerization vessel 202 and a polymerization reactor (e.g. extruder 204). Ester-substituted phenol may be removed from either or both of the oligomerization vessel 202 and/or a polymerization extruder 204. Preferably as depicted in FIG. 2, ester-substituted phenol is removed vial byproduct line 209. In this embodiment late addition of reaction components, reaction agent additives, and/or processing agent additives may occur. In a preferred embodiment the late addition is achieved introducing another stream 210 to the second reactor. In this embodiment, the reaction components will further comprise polycarbonate oligomer. Stream 210 comprises any of a reaction agent additive, a processing agent additive, ester-substituted diaryl carbonate, dihydroxy compound, and/or catalyst dissolved or suspending in a carrier liquid comprising an ester-substituted phenol. The composition of stream 210 is selected such that ester-substituted phenol is not produced as a reaction product in stream 210.

Figure 3:
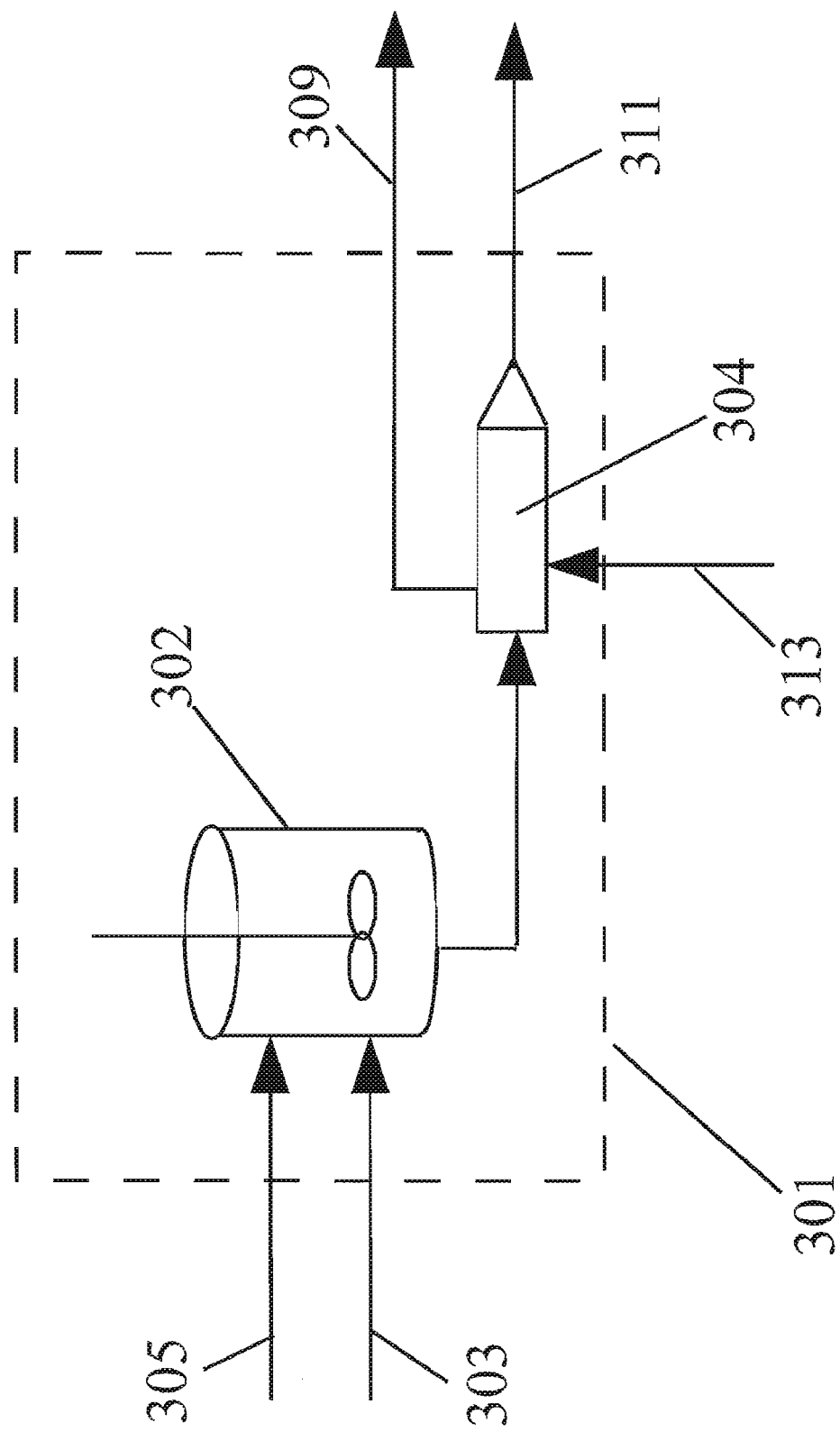

The present invention also provides a method of introducing a reaction agent additive stream to the plurality of reaction components in a melt polymerization reaction system or to the product polycarbonate. The present embodiments may be used alone or in any combination with the embodiments described above. The reaction agent additive may be introduced to the reaction components within a reactor in one of the plurality of reaction component streams where the selected reaction component stream further comprises the reaction agent additive. Alternatively or in addition to this, a separate reaction agent additive stream may be added to the reaction components within the reaction system. This separate reaction agent additive stream will comprise one or more reactions agent additives (e.g. an end-capper, inter alia, described above) dissolved or suspended in a carrier liquid comprising an ester-substituted phenol. For example, as depicted in FIG. 3, a reaction agent additive is added to the reaction system 301, which is similar to reaction system 201 described above with regard to FIG. 2. The reaction agent additive stream 301 can be added to either or both of the oligomerization vessel 302 and/or a polymerization reactor 304. In FIG. 2, reaction agent additive stream 313 is added to the polymerization reactor 304. The reaction agent additive stream 313 comprises at least one reaction agent additive dissolved or suspended in a carrier liquid comprising an ester-substituted phenol.

Figure 4:
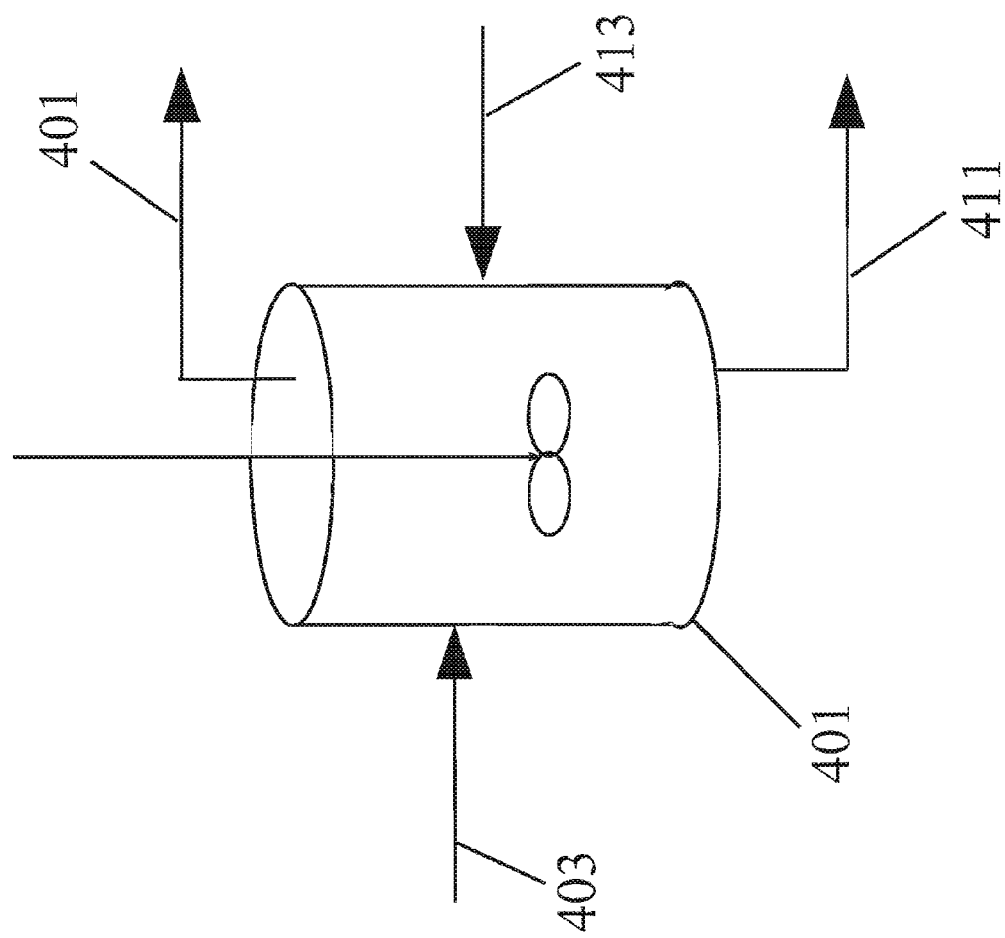

In another embodiment the reaction agent additive stream is used separately from the embodiment described above with regard to the addition of the reaction components dissolved or suspended in an ester-substituted phenol. In this embodiment, as depicted in FIG. 4, the method includes introducing a plurality of reaction components 203 to a reactor 201 or reactor system, operating under melt polymerization conditions. The plurality of reaction components comprise a dihydroxy compound, an ester-substituted diaryl carbonate, and a melt transesterification catalyst. A reaction agent additive stream 413 is introduced to the plurality of reaction components in the reactor 401. The reaction agent additive stream 413 comprises at least one reaction agent additive dissolved or suspended in a carrier liquid comprising an ester-substituted phenol. Ester-substituted phenol is removed from the reactor 401 via an ester-substituted phenol byproduct stream 409. Product polycarbonate is formed in the reactor 401 and removed therefrom via line 411.

Figure 5:
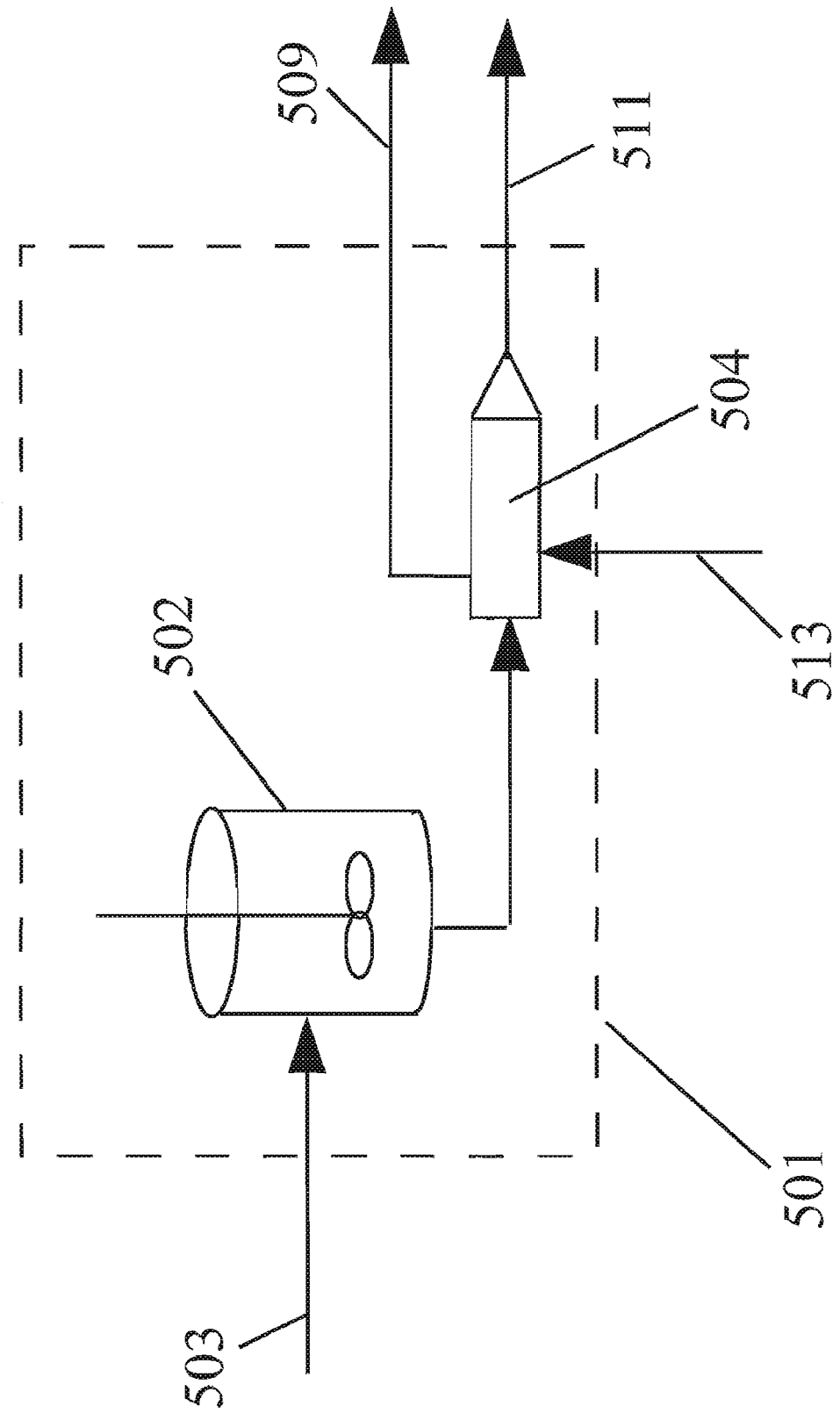

Line 411 may be introduced to further polymerization reactors in the reaction system to further build molecular weight and/or remove ester-substituted phenol. In this later embodiment as depicted in FIG. 5, the reaction system 501 comprises an oligomerization vessel 502 and a polymerization reactor (e.g. extruder 504). A reaction agent additive dissolved or suspended in a carrier liquid comprising an ester-substituted phenol is introduced to the reaction system 501 via an additive stream 513 to the polymerization extruder 504. Ester-substituted phenol may be removed from either or both of the oligomerization vessel 502 and/or a polymerization extruder 504. Preferably as depicted in FIG. 5, ester-substituted phenol is removed vial byproduct line 509 from extruder 504.

The composition of the reaction agent additive stream is not particularly limited other than it comprises a reaction agent additive dissolved or suspended in a carrier liquid comprising an ester-substituted phenol. Where the reaction agent additive comprises a compound that is not easily dissolvable in an ester-substituted phenol the stream is prepared and transferred to the reaction system in a slurry where the reaction agent additive is suspended within the ester-substituted phenol. In other embodiments, a polar co-solvent such as a polar (a) protic solvent described above is also employed.

The present invention also provides a method of introducing a processing agent additive stream to the plurality of reaction components in a melt polymerization reaction system or to the product polycarbonate. The present embodiments may be used alone or in any combination with the embodiments described above. The processing agent additive may be introduced to and blended with the polycarbonate formed by any of the methods described above, where the selected processing agent is dissolved or suspended in an ester-substituted phenol carrier liquid. Any known method of mixing and blending polymer with processing agent additive may be employed once the reaction agent additive stream and the polycarbonate are brought into contact.

The reaction components, reaction agent additives, and/or processing agent additives are dissolved or suspended in a carrier liquid comprising the ester-substituted phenol. Depending on the amount of reaction component and/or additive contained within the stream a simple mass balance can be performed to determine the amount or flow rate of the stream to be added to the reactor.

EXAMPLES

Having described the invention in detail, the following examples are provided. The examples should not be considered as limiting the scope of the invention, but merely as illustrative and representative thereof.

I. Polymerizations by Batch Oligomerization in Combination with Reactive Extrusion General Polymerization Procedure:

In the Examples provided in the following examples of the present section, melt polymerization reactions were carried out in the reactor system shown schematically in FIG. 6.1. In this system the oligomerization vessel A is charged at ambient temperature and pressure with the solid diol monomer BPA; solid bismethylsalicylcarbonate (BMSC); and the solid monofunctional phenol capping agent para cumyl phenol (PCP). The PCP chain stopper was added in amounts to yield approximately 50 mol % of PCP end groups at the targeted molecular weight. The amount of additional added BMSC is 0.5 times the amount of added chain stopper. The catalysts tetramethyl ammonium hydroxide and sodium hydroxide were next added as an aqueous solution. After this the oligomerization reactor was sealed shut. The system was deoxygenated by briefly evacuating the oligomerization reactor and then introducing nitrogen. This process was repeated three times.

Using a piston pump, molten oligomer from the oligomerization reactor was then fed to a ZSK 25 extruder C in feed line 1. The ZSK 25 reactive extruder is a 25 mm diameter, twin screw, co rotating, intermeshing extruder having a length to diameter ratio (LOD) of 59. The oligomer was fed to the extruder at a rate of between 12 to 14 kg/h, and the screw speed was 300 rpm. The barrels of the extruder were set at 300° C. and the die head at 310° C. The ZSK 25 extruder was equipped with a high and low vacuum system to remove the methyl salicylate formed as a byproduct in the polycondensation reaction. The low vacuum system consisted of line 2, condenser D, vacuum pump F, and methyl salicylate (MS) holding tank H. The high vacuum system consisted of line 3, condenser E, vacuum pump G, and MS holding tank I. The two low vacuum vents are operated at a vacuum level of between 14 to 20 mbar. The subsequent four high vacuum vents were operated at a vacuum level of between 0.5 to 4 mbar. The extruder was operated under conditions of temperature, vacuum, residence time, and mixing intensity sufficient to promote polymerization.

Characterization of Polymers:

The levels of reaction byproducts in the polymers were measured by means of proton NMR alone or in combination with carbon NMR if needed for confirmation of the identification of new species. $^1$H-NMR spectra were recorded on a Bruker Avance Ultrashielded 400 MHz ($^1$H-Frequency) system equipped with a 5 mm QNP Probehead. The following settings were used:

Acquisition time: 2.56 seconds

Number of scans: 256

Recycle delay: 10 seconds

Experiment: 30 degr. 1H-pulse width

Temperature: 44° C.

BPA homopolymer samples were analyzed in deuterated chloroform (50-70 mg polymer in 1.0 ml CDCl$_3$) containing 0.1% w tetramethylsilane (TMS) as reference. BPA/MeHQ/HQ terpolymer samples were analyzed in deuterated tetrachloroethane (TCE) (50-70 mg polymer in 1.0 ml TCE) containing 0.1 wt % tetramethylsilane (TMS) as reference. The spectra were obtained by Fourier transformation of the FID after application of 0.3 Hz apodization and phase correction. The chemical shift of the TMS protons is set at 0.0 ppm. A spectrum of the $^1$H-NMR solvent was recorded to determine the ratio of undeuterated chloroform (d=7.25 ppm) or undeuterated TCE to TMS. The values are reported as mole % relative to the incorporated diol content of the polymer. Therefore for the homopolymers, the values are reported as mole % relative to the BPA molar content. Typical proton NMR assignments of reaction byproducts formed during melt polymerization using ortho-ester-substituted activated carbonates like BMSC are given in Table 1.

TABLE 1

Typical proton NMR assignments of reaction byproducts

| Functional Group | Typical 1H-NMR assignment (ppm) |
|---|---|
| total Terminal Salicylate | 8.03/8.05 (2J = 7 Hz, doublet, 1 proton) Methylester group at 3.85 ppm |
| total Internal Salicylate | 8.20/8.22 (2J = 7 Hz, d, 1H) |
| BPA - Salicyl-OH endgroup | 10.48 (CDCl3, OH, s, 1H) 10.38 (TCE, OH, s, 1H) 8.03/8.05 (2J = 7 Hz, d, 1H) |
| MeHQ - Salicyl-OH endgroup | 10.33 (TCE, OH, d, 1H) 8.03/8.05 (2J = 7 Hz, d, 1H) |
| HQ - Salicyl-OH endgroup | 10.36 (CDCl3, OH, d, 1H) 10.31 (TCE, OH, d, 1H) 8.03/8.05 (2J = 7 Hz, d) |
| RS - Salicyl-OH endgroup | 10.33 (CDCle, OH, d, 1H) 8.03/8.05 (2J = 7 Hz, d, 1H) |
| total Methyl Carbonate | 3.87 (CH3O s, 3H) |
| total Methyl Ether | 3.76 (CH3O s, 3H) |
| Residual BMSC | 8.01/8.03 (2J = 7 Hz, d) |
| Residual MS | 10.73 (OH, s) 7.80/7.82 (2J = 7 Hz, d) |
| Linear Fries | 8.00 (3J = 3 Hz, d) 10.42 (OH, s) |
| Acid Fries | 7.75 (3J = 3 Hz, d) |
| Branched Fries | 8.13 (3J = 3 Hz, d) |
| PC-OH | 6.63/6.65 (2J = 7 Hz, d) |

The molecular weight properties of the polymers were determined by gel permeation chromatographic (GPC) analysis, using polycarbonate molecular weight standards to construct a broad standard calibration curve against which polymer molecular weights were determined. The terpolymer (TP) values were corrected based on their lower average repeat unit mass versus that of BPA homopolymers.

Working Example 1

Figure 7:
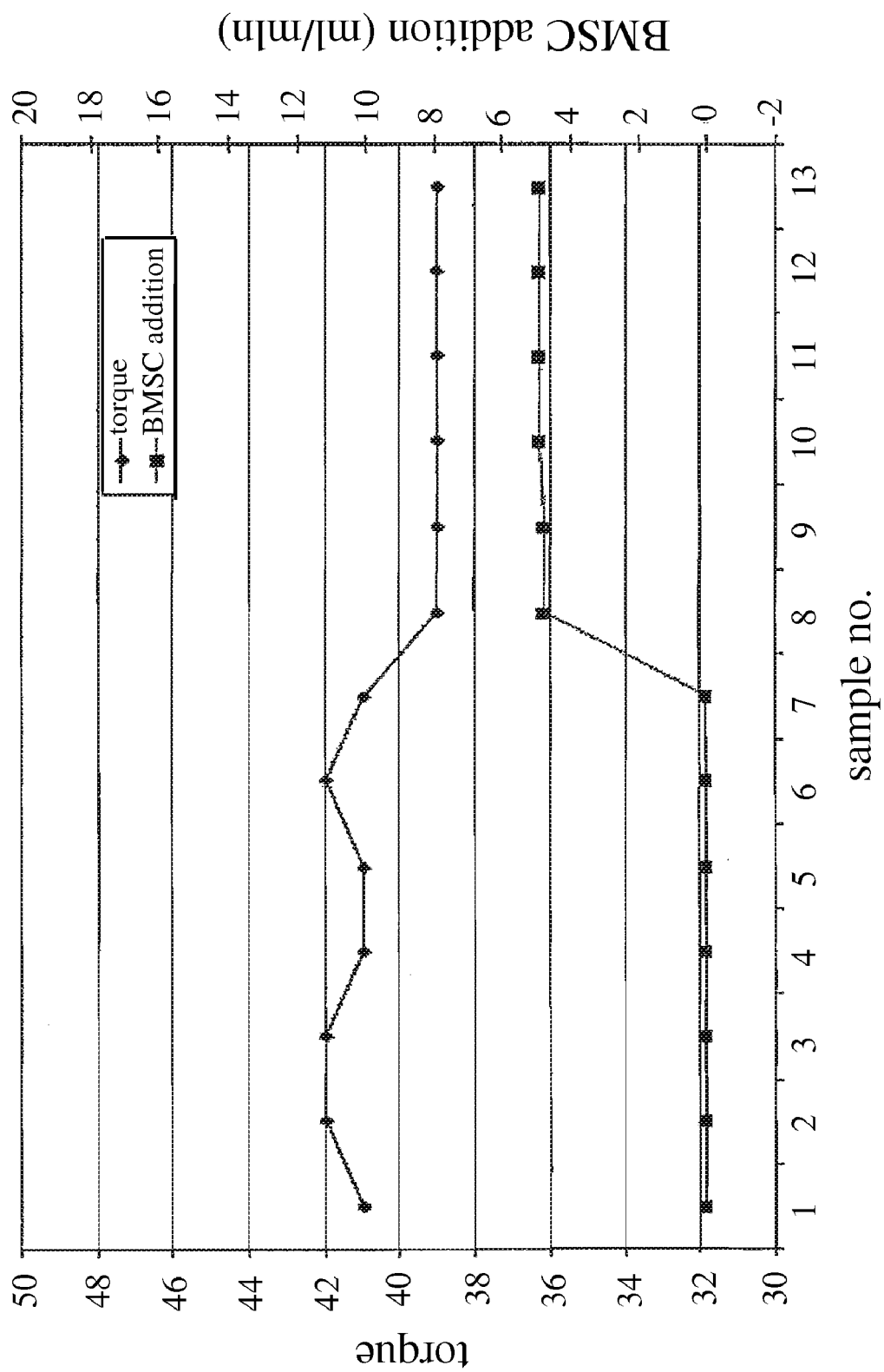
FIGS. 7-11 show graphical results from the example section.

Bismethylsalicylcarbonate (BMSC) in Methyl Salicylate (MS) Addition to the Reaction Components A reaction mixture comprising BPA, methylhydroquinone, and hydroquinone were reacted in a melt polymerization reaction to form a terpolymer in Working Example 1. The formulated BMSC/total diol molar ratio was 1.0195. The oligomer was fed to the extruder at a rate of 13.5 kg/hr for 3 hours. Extrusion at the above conditions obtained a polymer with a PC Mw 28,479 g/mol. At this time a solution of 4% (w/w) BMSC in methyl salicylate (MS) was fed to the extruder feed line at a rate of 5 ml/min. At this flow rate a shift in BMSC/diol mol ratio of 0.002 caused a Mw drop of the polycarbonate of 1,985 g/mol down to 26,714 g/mol. As shown in FIG. 7, a corresponding systematic decrease and a step change in the torque as measured on the extruder was also observed as the BMSC was added. No operational issues were observed before and during the addition period. As shown below in Table 2, no significant negative impact of the addition was observed on the polymer product properties such as color, residuals, or S byproducts.

TABLE 2

Comparison of S Polymer Properties Before & After Addition of BMSC Solution in MS

| | | | before | after |
|---|---|---|---|---|
| GPC | Mw (PC) | [g/mol] | 28479 | 26714 |
| HPLC | MS | [ppm] | 56 | 57 |
| | BMSC | [ppm] | 35 | 39 |
| H-NMR | BPA-SalOH | ppm | <5 | <5 |
| | MeHQ-SalOH | ppm | <5 | <5 |
| | HQ-SalOH | ppm | <5 | <5 |
| | TMsC | mol % | 0.97 | 1.04 |
| | IMsC | mol % | 0.48 | 0.58 |
| | MethylCarb | mol % | 0.28 | 0.29 |
| | MethylEther | mol % | 0.12 | 0.16 |
| | PC-OH | ppm | <15 | <15 |
| | HQ-OH | ppm | <20 | <20 |
| | MeHQ-OH | ppm | <20 | <20 |
| Color | L* | | 85.3 | 84.9 |
| Xrite | a* | | 2.27 | 2.64 |
| | b* | | 16.9 | 17.7 |

Working Example 2

BPA in MS Addition to the Reaction Components

Figure 8:
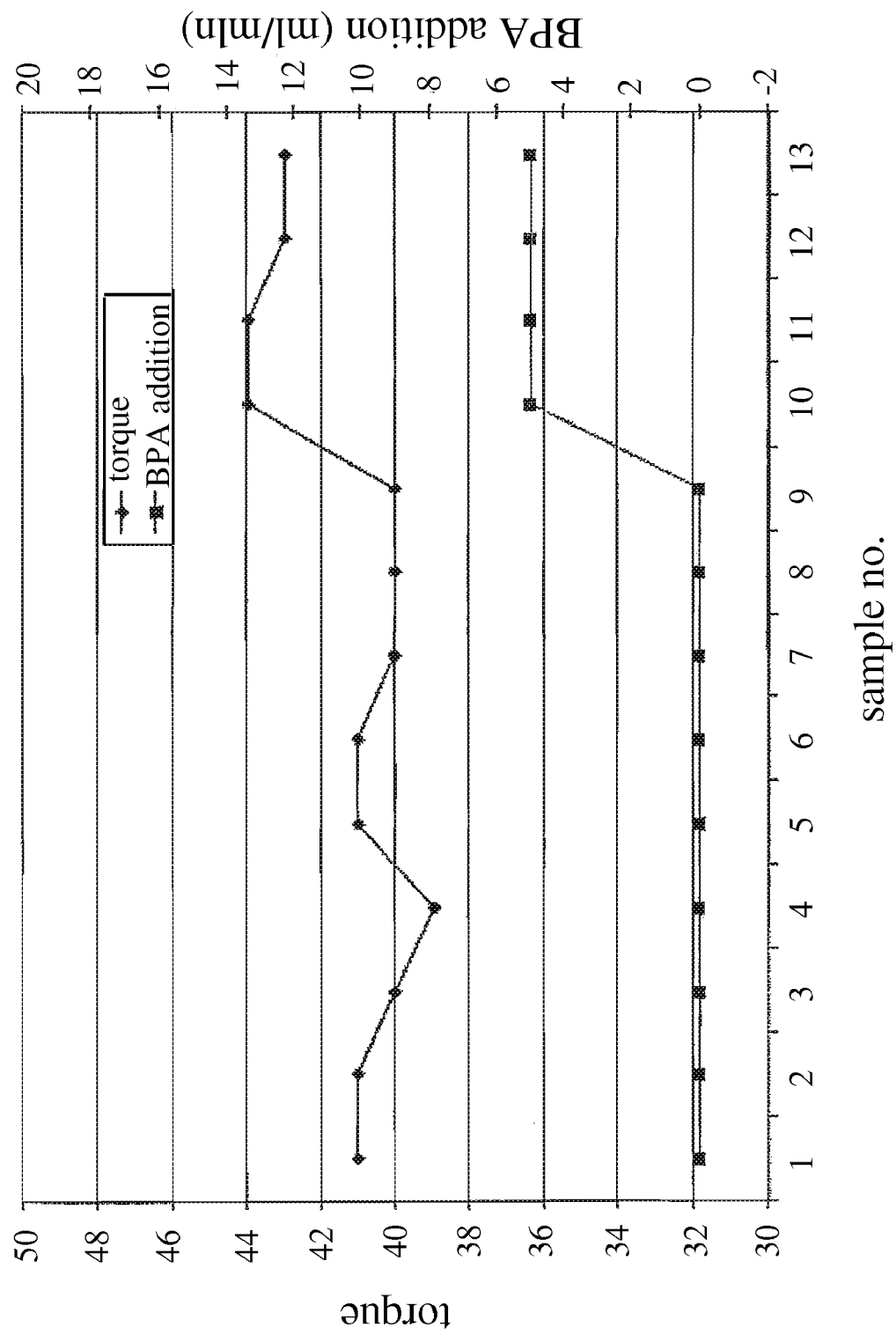

A reaction mixture comprising BPA, methylhydroquinone, and hydroquinone were reacted in a melt polymerization reaction to form a terpolymer in Working Example 2. The formulated BMSC/diol mol ratio was 1.02. Oligomer was fed to the extruder at a rate of 13.5 kg/hr for 3 hours. Extrusion at standard conditions obtained a polymer with a PC Mw 28,244 g/mol. At this time a solution of 4% (w/w) BPA in MS was fed to the extruder feed line at a rate of 5 ml/min. At this flow rate a shift in BMSC/diol mol ratio of 0.002 caused a PC Mw increase of 3,574 g/mol up to 31,818 g/mol. As shown in FIG. 8, a corresponding systematic increase and step change in the torque as measured on the extruder was also observed as the BPA was added. No operational issues were observed before and during the addition period. As shown below in Table 3, no significant negative impact of the addition was observed on the polymer product properties such as color, residuals, or byproducts.

TABLE 3

Comparison of Polymer Properties Before & After Addition of BPA Solution in MS

| | | | before | after |
|---|---|---|---|---|
| GPC | Mw (PC) | [g/mol] | 28244 | 31603 |
| HPLC | MS | [ppm] | 69 | 81 |
| | BMSC | [ppm] | <NDA | <NDA |
| H-NMR | BPA-SalOH | ppm | <5 | <5 |
| | MeHQ-SalOH | ppm | <5 | <5 |
| | HQ-SalOH | ppm | <5 | <5 |
| | TMsC | mol % | 0.81 | 0.40 |
| | IMsC | mol % | 0.63 | 0.67 |
| | MethylCarb | mol % | 0.35 | 0.36 |
| | MethylEther | mol % | 0.16 | 0.19 |
| | PC-OH | ppm | <15 | 15 |
| | HQ-OH | ppm | <20 | 20 |
| | MeHQ-OH | ppm | <20 | 22 |
| Color | L* | | 85.0 | 84.1 |
| Xrite | a* | | 2.09 | 2.86 |
| | b* | | 16.5 | 16.6 |

Working Example 3

Non-Aqueous Catalyst Solution in MS/MeOH Addition to the Reaction Components In this example a non-aqueous catalyst solution based on MS and methanol (MeOH) as co-solvent was used to polymerize on a reactive extruder an oligomer prepared by a batch oligomerization process. A reaction mixture comprising BPA, methylhydroquinone, and hydroquinone were reacted in a melt polymerization reaction to form a terpolymer in Working Example 3. The formulated BMSC/diol mol ratio was 1.0175. For 4 hours the oligomer was fed to the extruder at a rate of 11.5 kg/hr. A polymer was obtained with an average Mw 23,979 g/mol. During this time a catalyst solution of $2.5013 \times 10^5$ mol/(mol diol) TMAA and $2.099 \times 10^6$ mol/(mol diol) NaOH in MS/MeOH combined liquid carrier comprising an ester-substituted phenol and polar co-solvent was added to the oligomer reactor M at a flow rate of 0.2 ml/min. At the same time an additional catalyst solution of $5.981 \times 10^6$ mol/(mol diol) NaOH in MS/MeOH was added to the extruder feed line 1 at a rate of 0.1 ml/min. The relative amounts of MS and MeOH used in the non-aqueous catalyst liquid carrier system were 99:1 (mass % basis). No operational issues were observed during the run.

TABLE 4

Polymer properties obtained during addition of non-aqueous catalyst solutions (MS/MeOH)

| | | Time [hh:mm] | 16:57 | 17:08 | 17:20 | 17:32 | 17:50 | 18:07 | 18:24 | 18:41 | 18:57 | 19:31 | 20:04 |
|---|---|---|---|---|---|---|---|---|---|---|---|---|---|
| GPC | Mw (PC) | [g/mol] | 24438 | 23953 | 23895 | 23491 | 23719 | 23708 | 23952 | 24189 | 24044 | 24343 | 24032 |
| HPLC | MS | [ppm] | 42 | 44 | 44 | 45 | 45 | 46 | 48 | 48 | 48 | 49 | 51 |
| | BMSC | [ppm] | 101 | 111 | 115 | 118 | 120 | 119 | 110 | 123 | 117 | 121 | 127 |
| H-NMR | BPA-SalOH | ppm | | | <5 | | | | <5 | | | | <5 |
| | MeHQ-SalOH | ppm | | | <5 | | | | <5 | | | | <5 |
| | HQ-SalOH | ppm | | | <5 | | | | <5 | | | | <5 |
| | TMsC | mol % | | | 1.94 | | | | 1.90 | | | | 1.90 |
| | IMsC | mol % | | | 0.22 | | | | 0.22 | | | | 0.21 |
| | MethylCarb | mol % | | | 0.25 | | | | 0.24 | | | | 0.24 |
| | MethylEther | mol % | | | <0.05 | | | | <0.05 | | | | <0.05 |
| | PC-OH | ppm | | | <15 | | | | <15 | | | | <15 |
| | HQ-OH | ppm | | | <20 | | | | <20 | | | | <20 |
| | MeHQ-OH | ppm | | | <20 | | | | <20 | | | | <20 |

Working Example 4

Antioxidant in MS Addition to the Reaction Components

A melt polymerization reaction was performed in this example where the monomers comprised BPA/PPP BP 65/35+15% (w/w) PLURONIC® L35 surfactant from BASF Corp. (Polyoxypropylene-polyoxyethylene Block Copolymer, CAS # 9003-11-6). After feeding oligomer to the extruder, at a flow rate of 9 kg/hr, for 1 hour and 50 minutes, addition of a solution of 55.3 g/L Irganox™ 1010, ([3 (3,5 di tert.butyl 4 hydroxyphenyl) propionate]) dissolved in MS (0.5 weight % of the Pluronics amount) to the extruder feed line 1 was started at a flow rate of 1 ml/min. The formulated BMSC/diol mol ratio was 1.023. No operational issues were observed. As shown below in Table 4, no significant negative impact of the addition was observed on the polymer product properties such as color, residuals, or byproducts characteristic of activated diaryl carbonate. Results of working example 4, before and after start addition of Irganox are given in Table 5.

TABLE 5

Comparison of Polymer Properties Before & After Addition of Irganox Solution in MS

| | | | Before Addition | | | After Addition | | | | |
|---|---|---|---|---|---|---|---|---|---|---|
| | Time | [hh:mm] | 13:00 | 13:12 | 13:34 | 13:56 | 14:21 | 14:40 | 15:15 | 15:37 |
| Feed | Ratio | [—] | 1.023 | 1.023 | 1.023 | 1.023 | 1.023 | 1.023 | 1.023 | 1.023 |
| | [TMAH] | [eq] | 25 | 25 | 25 | 25 | 25 | 25 | 25 | 25 |
| | [NaOH] | [eq] | 6 | 6 | 6 | 6 | 6 | 6 | 6 | 6 |

TABLE 5-continued

Comparison of Polymer Properties Before & After Addition of Irganox Solution in MS

| | | | Before Addition | | | After Addition | | | | |
|---|---|---|---|---|---|---|---|---|---|---|
| | Time | [hh:mm] | 13:00 | 13:12 | 13:34 | 13:56 | 14:21 | 14:40 | 15:15 | 15:37 |
| GPC | Mw (PC) | [g/mol] | 25880 | 26102 | 26019 | 25907 | 25513 | 25760 | 25328 | 24983 |
| | Mn (PC) | [g/mol] | 11949 | 12057 | 11973 | 11897 | 11766 | 11828 | 11583 | 11420 |
| | d | [—] | 2.16 | 2.16 | 2.16 | 2.17 | 2.16 | 2.17 | 2.18 | 2.18 |
| HPLC | MS | [ppm] | 211 | 206 | 188 | 180 | 170 | 164 | 148 | 145 |
| H-NMR | BPA-SalOH | ppm | | 20 | | | | | | 39 |
| | TMsC | mol % | | 0.70 | | | | | | 0.32 |
| | IMsC | mol % | | 0.80 | | | | | | 1.03 |
| | MethylCarb | mol % | | 0.42 | | | | | | 0.53 |
| Color | L* | [—] | 75.87 | 76.71 | 77.29 | 76.93 | 77.09 | 77.4 | 77.5 | 77.82 |
| Xrite | a* | [—] | 3.63 | 3.56 | 3.69 | 3.65 | 3.66 | 3.72 | 3.7 | 3.64 |
| | b* | | 33.75 | 34.09 | 34.69 | 34.28 | 34.22 | 34.64 | 33.98 | 33.95 |

II. Polymerizations Using Plug-Flow Reactor/Flash Devolatization/Reactive Extruder Hybrid System Schematic Diagram/Description of Process In the Examples provided in the following examples of the present section, melt polymerization reactions were carried out in the reactor system shown schematically in FIG. 6.2. In this system the monomer mix vessel A is charged at ambient temperature and pressure with the solid diol monomer, BPA; solid BMSC; and the solid monofunctional phenol capping agent PCP. The PCP chain stopper was added in amounts to yield approximately 40 mole % of PCP end groups at the targeted molecular weight. The standard BMSC/diol monomer molar ratio is 1.02 after this the monomer mix reactor was sealed shut. The system was deoxygenated by briefly evacuating the monomer mix reactor and then introducing nitrogen. This process was repeated three times. Then, in order to melt the monomers, the pressure is set to 800 mbar and the temperature is increased at about 120° C. The liquid mixture is continuously stirred.

Using a piston pump (B), the molten monomer mix is then fed to a preheater (C). This preheater heats up the monomer mix to the desired oligomerization temperature. After the preheater, the catalyst solution (tetramethylammonium hydroxide and/or sodium hydroxide aqueous solution) is added by using pumps D and E. The oligomerization reaction takes place in the plug flow reactor (F). The oligomerization temperatures typically range between 150 and 230° C., the residence time in the plug flow reactor varies between 2-10 minutes. The pressure is usually kept about 5 bar, in order to ensure that no vapour phase is formed.

The oligomer is then fed to the preheater G. The temperature in this preheater range between 150 and 240° C. The pressure is kept below 500 mbar in order to start evaporation of methylsalycilate. The concentration of MS remaining in the liquid phase (oligomer) varies around 10-20 wt %. Then, the oligomer mixture is fed through the distributor to the flash vessel H. In the flash vessel, additional MS is removed and molecular weight is further increased. In the flash vessel the pressure typically varies between 50 and 300 mbar, the temperature is kept between 150 and 240° C.

The MS evaporated leaves the flash vessel and condenses in condensers K1 and K2. It is collected as a liquid in storage vessel L.

The oligomer is pumped out of the flash vessel to the extruder using the gear pump I. The amount of MS in this oligomer varies between 0.5 and 20 wt %, depending on the temperature and pressure settings of the flash vessel.

The extruder used is a ZSK-25 extruder. It is a 25 mm diameter, twin screw, co-rotating, intermeshing extruder having a length to diameter ratio (LID) of about 59. The oligomer was fed to the extruder at a rate between 5 and 25 kg/h. The screw speed varies between 300 and 500 rpm. The barrels of the extruder are set at 300° C., the die head at 310 C. The ZSK-25 extruder is equipped with a high vacuum system to further remove the methyl salicylate formed as a byproduct in the polycondensation reaction.

Comparative Example 1

BPA Homopolymer Run with Addition of Aqueous Catalyst Solution

In this example an aqueous catalyst solution was used. The monomer mix was prepared mixing 110,243 g of BMSC, 74,698 g of BPA and 1,112 g of PCP. The monomers were molten at a tank temperature of 120° C. and a pressure of 800 mbar. The formulated BMSC/diol mol ratio was 1.02. As soon as a clear monomer mix solution was obtained (about 4 hours after heating was started), the monomer mix temperature was set to 100° C. and the monomer solution was pumped to the preheater. The preheater process temperature was 200° C.

The monomer mix reached the plug flow reactor, where, initially, a solution containing 50 eq TMAH/8 eq NaOH in water was added. The plug flow reactor heating oil temperature was 200° C. and the pressure 4 bar. The monomer mix throughput is 25 kg/h, and the residence time in the plug flow reactor was 5 minutes. At these conditions the oligomer at the exit of the plug flow reactor contained about 50 wt % MS.

The oligomer was then fed to the second preheater (250° C., 500 mbar) and it then reached the flash vessel (240° C., 100 mbar). The oligomer was then fed to the extruder. Extrusion at 300° C. with a 300 rpm screw speed obtained a polymer with an average Mw of 29,072 g/mol (relative to PC standards).

In several settings the catalyst flow was varied, and the PC Mw was measured from steady state polymer samples of each setting. The results are listed in Table 6.

TABLE 6

Polymer PC Mw comparative example 1

| Water solvent flow rate (ml/min) | PC Mw |
|---|---|
| 0.3 | 29072 |
| 0.1 | 20466 |
| 0.15 | 25278 |
| 0.25 | 24960 |
| 0.2 | 25161 |

Working Example 5

BPA Homopolymer Run with Cat Addition in MS/AcH

In this example a non-aqueous catalyst solution based on MS and acetic acid (AcH) as co-solvent was used. The monomer mix was prepared by mixing 110,089 g of BMSC, 74,595 g of BPA and 1,110 g of PCP. The monomers were molten at a tank temperature of 120° C. and a pressure of 800 mbar. The formulated BMSC/diol mol ratio was 1.02. As soon as a clear monomer mix solution was obtained (about 3 hours after the heating was started), the monomer mix temperature was set to 100° C. and the monomer solution was pumped to the preheater. The preheater process temperature was 200° C.

The monomer mix reached then the plug flow reactor, where initially a solution containing 50 eq TMAH/4 eq NaOH in MS/AcH was added. The relative amounts of MS and AcH used in the non-aqueous catalyst liquid carrier system were 99:1 (mass % basis). The plug flow reactor temperature was 200° C. and the pressure 4 bar. The monomer mix throughput was 25 kg/h, and the residence time in the plug flow reactor is 5 minutes. Under these conditions the oligomer at the exit of the plug flow reactor contained about 49 wt % MS.

The oligomer was then fed to the second preheater (250° C., 500 mbar) and it then reached the flash vessel (240° C., 100 mbar). The oligomer was then fed to the extruder. At these conditions the oligomer leaving the flash reactor contained about 2.5% wt MS and had a Mw (PC) of about 16,100 g/mol (relative to PC standards).

In several settings the catalyst flow was varied, and the PC Mw was measured from steady state polymer samples of each setting. The results are listed in Table 7.

TABLE 7

Comparison of polymer Mw obtained with addition of different amounts of non-aqueous catalyst solution (MS/AcH)

| MS/AcH solvent flow rate (ml/min) | PC Mw |
|---|---|
| 0.15 | 29075 |
| 0.1 | 28502 |
| 0.1 | 27299 |
| 0.1 | 27962 |
| 0.05 | 27922 |

Figure 9:
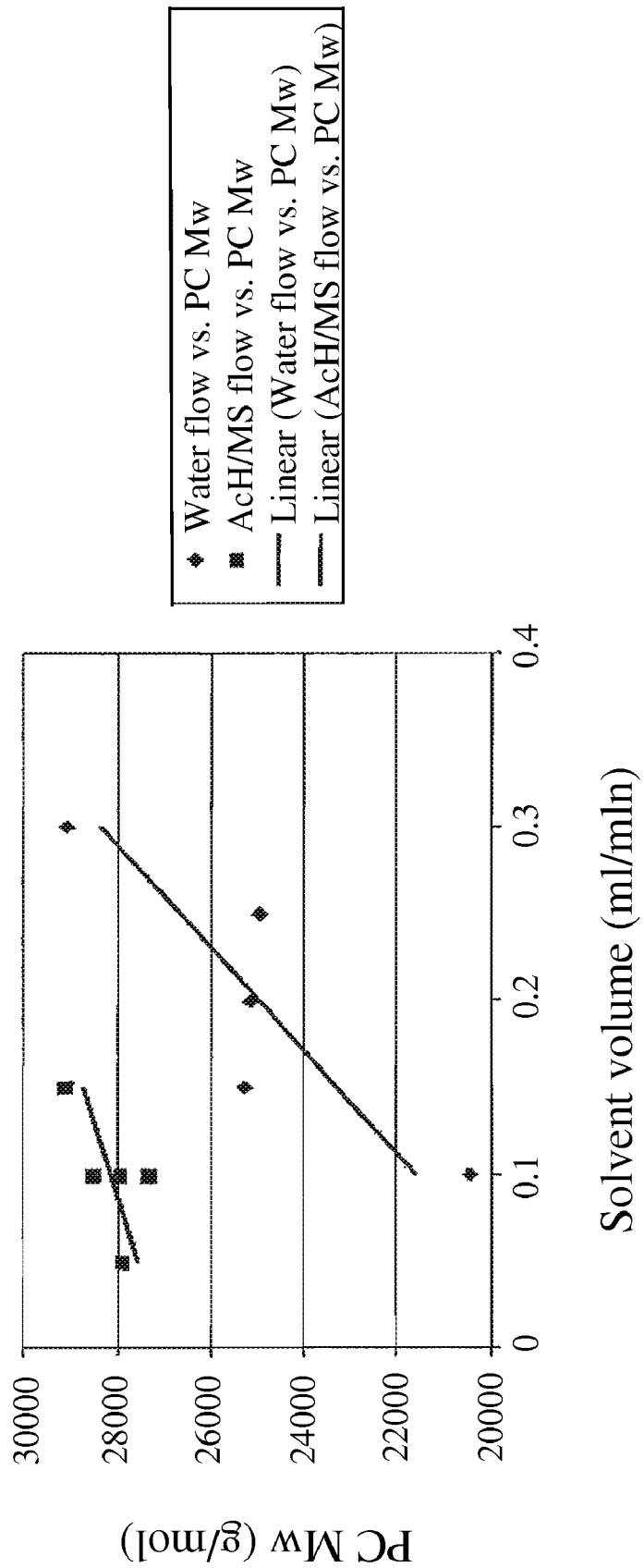

The process conditions of both examples are summarized in Table 8 and the molecular weight (relative to PC standards) response as a function of changes in the catalyst flow are summarized for the two examples in FIG. 9. Linear regression lines are included for each of the two data sets.

TABLE 8

Summarized comparison of process conditions for Comparative Example 1 and Working Example 5

| Run conditions | | | C. E. 1 | W. E. 5 |
|---|---|---|---|---|
| Monomer mix | molar ratio BMSC/Bisphenols | | 1.02 | 1.02 |
| | Tm (avg.) | C. | 106 | 106 |
| | Pressure | atm | atm | atm |
| | Flow | Kg/hr. | 25 | 25 |
| PFR | Tm (avg.) | C. | 182 | 175 |
| | Pressure | mBarg | 4.1 | 4.1 |
| Flash tank | Tm (avg.) | C. | 229 | 231 |
| | Pressure (avg.) | mBarg | 74 | 76 |
| Extruder | Barrel temp (avg.) | C. | 300 | 300 |
| | Screw speed | rpm | 300 | 300 |

III. Small Scale Polymerizations

A series of small-scale oligomerization and polymerization reactions were carried out in glass tube reactors, which had the same vacuum system. Before charging the monomers the glass reactor tubes where soaked in 1M HCl for at least 24 hours to remove any sodium present at the surface of the glass. After this acid bath the glass tubes where rinsed using 18.2 MW (Milli-Q quality) water for at least 5 times. The batch reactor tubes were charged at ambient temperature and pressure with 20.00 g of solid BMSC and the required number of grams of solid bisphenol A (BPA) to obtain a baseline stoichiometry (BMSC/BPA) of 0.9500 for each example. After this the reactor system was sealed shut, the system was deoxygenated by briefly evacuating the reactors and then introducing nitrogen. This process was repeated three times. 100 μl of the catalyst solution (two-part alpha/beta catalyst solution: 25 mass % TMAH and 0.5 M aqueous sodium hydroxide) was added to each reactor as an aqueous solution in the following Examples. The temperature of the reactor was maintained using a heating mantle with a PID. The pressure over the reactor was controlled by a nitrogen bleed into the vacuum pump downstream of the distillate collection flasks and measured with a pressure gauge. The reactor was brought to near atmospheric pressure and reaction time is started at the same moment as the heaters are switched on. The reactions were carried out according to the conditions in Table 9. In some of the examples, a solution of a chosen monomer (e.g. the aromatic dihydroxy compound BPA or the monofunctional end-capper PCP) was injected into the melt at a reaction time of 10 minutes, as noted. In Table 8, "Tr" is the set point temperature of the reactor; and "To" is the set point temperature of the overhead. The vacuum system removed the methyl salicylate byproduct, which was condensed in condensers. The product was recovered by removing a drain nut at the bottom of each reactor.

TABLE 9

Reaction profile for small-scale polymerizations

| Time | Remarks |
|---|---|
| 0:00:00 | Set $T_r$ at 170° C.; $T_o$ at 100° C., pressure at 100 kPa |
| 0:06:00 | Set stirrer to approximately 300 rpm |
| 0:10:00 | Optional addition of solution of monomer in MS to the reactor |

TABLE 9-continued

Reaction profile for small-scale polymerizations

| Time | Remarks |
|---|---|
| 0:15:00 | Set P at 50 kPa |
| 0:45:00 | Set Tr to 270° C. |
| 0:50:00 | Set Tr at 300° C. and P at 0 kPa |
| 1:04:00 | Open reactor to vent and stop reaction. Drain polymer from reactor. |

Working Example 6

Addition of BPA in MS to the Reaction Components

Melt polymerization reactions were conducted with a late addition of BPA to produce BPA homopolymers having modified reaction stoichiometries and thus modified final molecular weights. Two runs were carried out in which BPA was introduced as a solution of BPA in MS (concentration: 0.1580 mol/l) at a reaction time of 10 minutes in amounts of 600 μl or 4000 μl in order to modify the baseline stoichiometry from 0.9500 to a final polymerization stoichiometric ratio of either 0.9486 or 0.9400, respectively. The reaction was subsequently completed using the polymerization profile given in Table 9. As a comparison a blank run in which no solution of BPA in MS was added and thus the baseline stoichiometry (0.9500) was unchanged throughout the polymerization process. All three polymerizations yielded transparent colorless polymers, and the molecular weight data are summarized in Table 10.

Spiking Experiments with Co-Solvents and Identification of Co-Solvent Reaction Byproducts There is a possibility of byproduct reactions occurring when co-solvents are used together with MS in order to improve the solubility of salts such as transesterification catalysts. These byproduct reactions may result in the incorporation of low levels of new functional groups in the polycarbonate. For example, alkyl alcohols may react to give end groups like alkyl carbonates such as methyl carbonate when methanol is used as a co-solvent. Organic acids may react to give new end groups like acetate esters when acetic acid is used as a co-solvent. Other co-solvents such as DMSO may undergo high temperature degradation reactions that result in the incorporation of sulfur-containing byproducts.

In these experiments, BPA homopolymerizations were carried out as in working example 6 except amounts of 0.5 ml the co-solvents methanol, acetic acid, and DMSO were each added to a reactor tube (20.4, 14.4, and 11.6 mole % relative to BMSC, respectively) and no co-solvent was added to a fourth blank tube. The molecular weight and solution YI data are summarized in Table 11. Spiking with methanol increased the relative amount of methyl carbonate to methyl ether end groups but gave no significant color formation, even at higher spiking loadings. Spiking with acetic acid gave some slight color formation and molecular weight reduction, especially at higher spiking loadings. Spiking with DMSO gave significant smell and color formation, especially at higher spiking loadings.

TABLE 10

Comparison of polymer Mw obtained with addition of different amounts of BPA in MS

| | | Final | relative to PS | | | relative to PC | |
|---|---|---|---|---|---|---|---|
| Reactor | Description | Polymerization Ratio | Mw (g/mol) | Mn (g/mol) | PD | Mw (g/mol) | Mn (g/mol) |
| 1 | Blank | 0.9500 | 18831 | 9157 | 2.06 | 12516 | 6086 |
| 2 | Late BPA addition (600 l) | 0.9486 | 18544 | 9008 | 2.06 | 12395 | 6021 |
| 3 | Late BPA addition (4000 l) | 0.9400 | 17578 | 8656 | 2.03 | 11989 | 5904 |

Working Example 7

PCP in MS Addition to the Reaction Components

A melt polymerization reaction was conducted with a late addition of end-capper para-cumyl phenol (PCP) to produce a BPA homopolymer partially end-capped with PCP. In one run PCP was introduced to the reaction components via a prepared solution of PCP in MS (concentration: 1.54 mol/l) at a reaction time of 10 minutes in an amount of 600 μl. The reaction was subsequently completed using the polymerization profile given in Table 9. As a comparison a blank run was carried out without addition of the solution of PCP in MS. Both polymerizations yielded transparent colorless polymers of the same molecular weight, and NMR analyses confirmed that all of the PCP was incorporated in the polymer chain.

TABLE 11

Comparison of polymer Mw, solution YI and methyl-based end groups obtained with different co-solvents

| co-solvent | Mw g/mol (PC) | Solution YI | Molar Ratio Methyl Carbonate/Methyl Ether |
|---|---|---|---|
| none (blank) | 15270 | 0.46 | 5 |
| MeOH | 15170 | 0.2 | 11.6 |
| acetic acid | 12200 | 0.79 | 3.8 |
| DMSO | 13400 | 1.3 | 4.4 |

A product made by the method of the present invention, using an above described co-solvent, can be identified as having a detectable amount of co-solvent present in the resulting polymer. For example, the proton NMR spectra, using a 400 Mhz $^1$H-NMR as described above, of the polymerization spiked with acetic acid as co-solvent is reported here and peak locations are reported relative to TMS. Two dominant new peaks are observed in the $^1$H-NMR spectra. One is a peak located at 6.97 ppm consisting of a split doublet and that is assigned to the alpha proton of BPA adjacent to the introduced acetate ester group. The region located at 2.2 ppm consists of several peaks with a main peak at 2.25 ppm. The integrals have a ratio of 3:2 (2.25:6.97). The peak at 2.25 ppm is assigned to the $CH_3$ group of the introduced acetate ester end group.

Furthermore, the proton NMR spectra, using a 400 Mhz $^1$H-NMR as described above, of the polymerization spiked with DMSO as co-solvent is reported here and peak locations are reported relative to TMS. Five new peaks are observed in the $^1$H-NMR spectra. The peak located at 6.85 ppm consists of a split doublet. The peaks located at 5.1 ppm and 3.66 ppm consists of a sharp singlet. The region at 2.1-2.4 ppm shows three sharp singlets, and the peak at 2.1 ppm is very small in magnitude because it is a satellite peak.

Further NMR analysis of the earlier examples (e.g. Working examples 3 and 5) or other polymerizations spiked with lower amounts of the co-solvent confirmed that the above described NMR features resulting from the use of the co-solvents and their resulting incorporation in the polymer product were observable but that the intensity of the features diminished as the relative amounts of co-solvent used decreased.

IV. Laboratory Experiments

There is a possibility of undesired transesterification reactions occurring between the ester-substituted phenol compound and some additives, particularly those having free OH groups. As such, it is desirable to understand the reactivity of the ester-substituted phenol used here as a carrier liquid for reaction components and additives. In this study, para cumyl phenol (PCP) and methyl salicylate (MS) were reacted to form p cumyl phenyl salicylate (PCPS) and methanol. The rate of this model reaction can be studied and provide insight into the rates of similar byproduct reactions in solutions of other additives having free OH groups in salicylate compounds as carrier liquids.

In these experiments, 20 g of total material was loaded into a 50 mL round bottom flask. The flask was temperature controlled by a hot oil bath set to the desired temperature of the reaction. Aqueous NaOH catalyst was added once the flask contents were at temperature, and samples were taken and measured by HPLC as a function of time. Experiments were made with varying ratio of MS to PCP, catalyst loading, and temperature.

Figure 10:
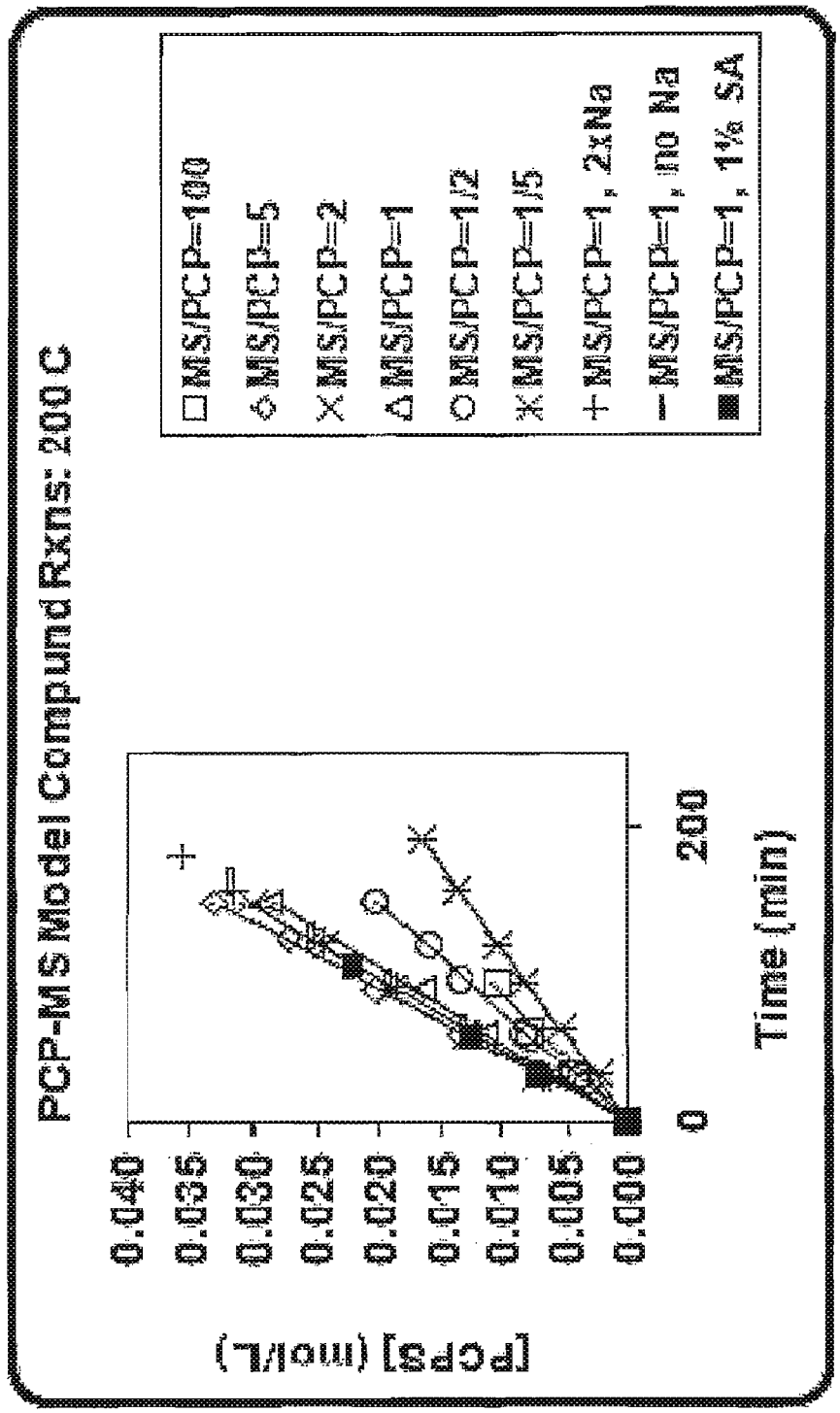
Figure 11:
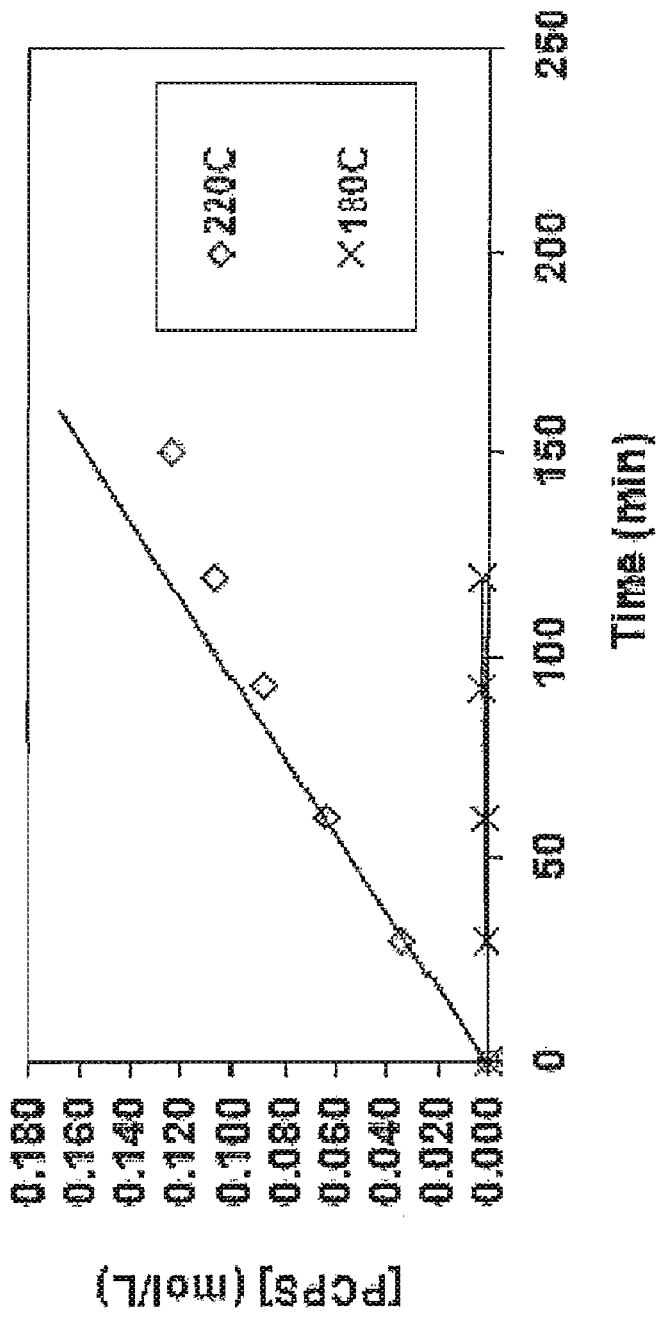

FIG. 10 below shows the reaction progress for different catalyst and molar ratios at 200° C. and FIG. 11 show the reactions at varying temperature. The reaction seems to be auto catalyzed as varying levels of NaOH and salicylic acid (SA) spiked reactions all proceed at the same rate. Also, the reaction does not appear to follow second order kinetics as expected. The apparent rate law regressed from the data is:

$$\frac{\partial [PCPS]}{\partial t} = k[MS]^{0.7}[PCP]^{0.3}$$

The reaction has a very high activation energy (nearly 50 kcal/mol) and thus can be controlled effectively by lowering the temperature. For example, at temperatures of less than 150° C., substantial reaction does not occur for residence times of less than 6 hours.

V. Solubility Examples

The following examples demonstrate the solubility of various reactions components and additives in various carrier liquids.

Working Example 8

Solubility of Reaction Components and Additives

Working Example 8 demonstrates the solubility of various reaction components and additives in MS. See Table 12.

TABLE 12

Solubility of reaction components and additives in MS

| Type | Chemical | wt % | Mass (g) | V MS (ml) | T (room) | T (50° C.) | T (75° C.) | T (90° C.) | T (100° C.) | T (125° C.) | T (150° C.) | Stable at T (room) for: |
|---|---|---|---|---|---|---|---|---|---|---|---|---|
| Anti-oxidant | Doverphos | 0.8 | 0.1 | 10.0 | | | | | Dissolved | | | <5 hours |
| | | 4.1 | 0.5 | 10.0 | | | | | | Dissolved | | <1 hour |
| | Irgafos 168 | 0.8 | 0.1 | 10.0 | Dissolved | | | | | | | 5 hours |
| | | 4.1 | 0.5 | 10.0 | | | Dissolved | | | | | <2 hours |
| | Irgafos 1010 | 4.1 | 0.5 | 10.0 | Dissolved | | | | | | | 6 hours |
| | | 4.8 | 0.6 | 10.0 | Dissolved | | | | | | | 6 hours |
| | | 5.6 | 0.7 | 10.0 | Dissolved | | | | | | | 6 hours |
| | | 6.3 | 0.8 | 10.0 | Dissolved | | | | | | | 6 hours |
| | | 20.2 | 3.0 | 10.0 | Dissolved | | | | | | | 6 hours |
| Monomer | Pluronics EP-3500 | 7.8 | 1.0 | 10 | Dissolved | | | | | | | >24 hours |
| | BMSC | 4.1 | 0.5 | 10 | | | | | Dissolved | | | >24 hours |
| | BMSC | 17.5 | 2.5 | 10 | | | | | | Dissolved | | >24 hours |
| | bis(3-methyl-4-hydroxyphenyl) | 0.8 | 0.1 | 10 | Dissolved | | | | | | | >48 hrs |
| | | 7.8 | 1 | 10 | | | | | Dissolved | | | 2-4 hrs |
| | Resorcinol | 0.8 | 0.1 | 10 | Dissolved | | | | | | | >48 hrs |
| | | 7.8 | 1 | 10 | | | | Dissolved | | | | >24 hrs |
| | Diphenyl Carbonate | 4.1 | 0.5 | 10 | | | | | | Dissolved | | >24 hours |
| | | 17.5 | 2.5 | 10 | | | | | | | | |
| | Methyl hydroquinone | 0.8 | 0.1 | 10 | Dissolved | | | | | | | >48 hrs |
| | | 7.8 | 1 | 10 | | | | Dissolved | | | | Crystalized upon cooling |

TABLE 12-continued

Solubility of reaction components and additives in MS

| Type | Chemical | wt % | Mass (g) | V MS (ml) | T (room) | T (50° C.) | T (75° C.) | T (90° C.) | T (100° C.) | T (125° C.) | T (150° C.) | Stable at T (room) for: |
|---|---|---|---|---|---|---|---|---|---|---|---|
| | | 17.5 | 2.5 | 10 | | | | | | | |
| | 1,12-Dodecanedi-carboxylic acid | 0.8 | 0.1 | 10 | | | | | Dissolved | | | Crystalized upon cooling |
| | | 7.8 | 1 | 10 | | | | | | | | |
| | Isosorbide | 0.8 | 0.1 | 10 | Dissolved | | | | | | | >48 hrs |
| | | 4.1 | 0.5 | 0.0 | Dissolved | | | | | | | >24 hours |
| End capper | Para-Cumyl Phenol | 4.1 | 0.5 | 10 | Dissolved | | | | | | | >24 hours |
| | | 17.5 | 2.5 | 10 | Dissolved | | | | | | | >24 hours |
| | | 29.7 | 5 | 10 | Dissolved | | | | | | | >24 hours |
| | | 45.8 | 10 | 10 | | | | | | | | |

Working Example 9

Solubility of Catalyst in Carrier Liquid

The approximate solubility of various transesterification catalysts in mixtures of MS and various low molecular weight organic acids and alcohols are given in Table 13. It should be noted that these salts were found not to be soluble in MS alone, nor was it possible to prepare solutions of these same compositions by substituting phenol for the MS.

TABLE 13

Solubility of catalysts in MS and co-solvents

| Catalyst | [catalyst] (wt %) | Mass (g) | V MS (ml) | V MeOH (ml) | V EtOH (ml) | V BuOH (ml) | V IPA (ml) | V AcH (ml) | T (room) |
|---|---|---|---|---|---|---|---|---|---|
| Tetra Methyl Ammonium Acetate | 1.62 | 0.3 | 10.0 | 8.0 | 0.0 | 0.0 | 0.0 | 0.0 | Dissolved |
| Tetra Butyl Ammonium Acetate | 2.47 | 0.3 | 10.0 | 0.0 | 0.0 | 0.0 | 0.0 | 0.0 | Dissolved |
| Na Acetate | 0.13 | 0.0334 | 20.0 | 2.0 | 0.0 | 0.0 | 0.0 | 0.0 | Dissolved |
| | 0.01 | 0.0033 | 20.0 | 0.2 | 0.0 | 0.0 | 0.0 | 0.0 | Dissolved |
| | 0.01 | 0.0033 | 20.0 | 0.0 | 1.5 | 0.0 | 0.0 | 0.0 | Dissolved |
| | 0.01 | 0.008 | 100.0 | 0.0 | 0.0 | 0.0 | 0.0 | 0.0 | |
| | 0.01 | 0.008 | 99.0 | 1.0 | 0.0 | 0.0 | 0.0 | 0.0 | Dissolved |
| | 0.14 | 0.835 | 450.0 | 50.0 | 0.0 | 0.0 | 0.0 | 0.0 | Dissolved |
| | 0.01 | 0.008 | 99.0 | 0.0 | 0.0 | 0.0 | 0.0 | 1.0 | Dissolved |
| | 0.28 | 1.67 | 450.0 | 0.0 | 0.0 | 0.0 | 0.0 | 50.0 | Dissolved |
| | 0.01 | 0.01 | 99.5 | 0.5 | 0.0 | 0.0 | 0.0 | 0.0 | Dissolved |
| | 0.01 | 0.01 | 99.5 | 0.0 | 0.0 | 0.0 | 0.0 | 0.5 | Dissolved |
| | 2.07 | 0.2 | 4.0 | 6.0 | 0.0 | 0.0 | 0.0 | 0.0 | Dissolved |
| | 0.18 | 0.02 | 4.0 | 0.0 | 0.0 | 0.0 | 0.0 | 6.0 | Dissolved |
| | 0.10 | 0.01 | 4.0 | 0.0 | 0.0 | 6.0 | 0.0 | 0.0 | Dissolved |
| | 0.09 | 0.01 | 7.0 | 0.0 | 0.0 | 3.0 | 0.0 | 0.0 | Dissolved |
| NaOH | 0.83 | 0.1 | 10.0 | 0.0 | 0.0 | 0.0 | 0.0 | 0.0 | |
| | 0.50 | 0.1 | 10.0 | 10.0 | 0.0 | 0.0 | 0.0 | 0.0 | Dissolved |
| KOH | 0.01 | 0.001 | 4.0 | 0.0 | 0.0 | 0.0 | 6.0 | 0.0 | Dissolved |
| | 0.01 | 0.001 | 7.0 | 0.0 | 0.0 | 0.0 | 3.0 | 0.0 | Dissolved |
| LiOH | 0.10 | 0.01 | 4.0 | 6.0 | 0.0 | 0.0 | 0.0 | 0.0 | Dissolved |
| | 0.09 | 0.01 | 7.0 | 3.0 | 0.0 | 0.0 | 0.0 | 0.0 | Dissolved |
| Na Formate | 0.83 | 0.1 | 10.0 | 0.0 | 0.0 | 0.0 | 0.0 | 0.0 | |
| | 0.42 | 0.1 | 10.0 | 15.0 | 0.0 | 0.0 | 0.0 | 0.0 | Dissolved |
| Na Propionate | 0.83 | 0.1 | 10.0 | 0.0 | 0.0 | 0.0 | 0.0 | 0.0 | |
| | 0.42 | 0.1 | 10.0 | 15.0 | 0.0 | 0.0 | 0.0 | 0.0 | Dissolved |
| Li Acetate | 0.83 | 0.1 | 10.0 | 0.0 | 0.0 | 0.0 | 0.0 | 0.0 | |
| | 0.57 | 0.1 | 10.0 | 7.0 | 0.0 | 0.0 | 0.0 | 0.0 | Dissolved |
| Tetra Phenyl Phosphonium Phenolate | 0.21 | 0.2 | 40.0 | 60.0 | 0.0 | 0.0 | 0.0 | 0.0 | Dissolved |
| | 0.10 | 0.1 | 60.0 | 40.0 | 0.0 | 0.0 | 0.0 | 0.0 | Dissolved |
| | 0.09 | 0.1 | 80.0 | 20.0 | 0.0 | 0.0 | 0.0 | 0.0 | Dissolved |
| | 0.08 | 0.1 | 99.5 | 0.5 | 0.0 | 0.0 | 0.0 | 0.0 | Dissolved |

TABLE 13-continued

Solubility of catalysts in MS and co-solvents

| CS-Acetate | 0.83 | 0.1 | 10.0 | 0.0 | 0.0 | 0.0 | 0.0 | 0.0 | |
| | 0.79 | 0.1 | 10.0 | 1.0 | 0.0 | 0.0 | 0.0 | 0.0 | Dissolved |

| Catalyst | [catalyst] (wt %) | T (50° C.) | T (75° C.) | T (90° C.) | T (100° C.) | T (125° C.) | T (150° C.) | Stable at T(room) for: |
|---|---|---|---|---|---|---|---|---|
| Tetra Methyl Ammonium Acetate | 1.62 | | | | | | | >72 hours |
| Tetra Butyl Ammonium Acetate | 2.47 | | | | | | | >72 hours |
| Na Acetate | 0.13 | | | | | | | >24 hours |
| | 0.01 | | | | | | | >24 hours |
| | 0.01 | | | | | | | >24 hours |
| | 0.01 | | | | | | | |
| | 0.01 | | | | | | | >72 hours |
| | 0.14 | | | | | | | >72 hours |
| | 0.01 | | | | | | | >72 hours |
| | 0.28 | | | | | | | >72 hours |
| | 0.01 | | | | | | | >24 hours |
| | 0.01 | | | | | | | >24 hours |
| | 2.07 | | | | | | | >24 hours |
| | 0.18 | | | | | | | >24 hours |
| | 0.10 | | | | | | | >24 hours |
| | 0.09 | | | | | | | >24 hours |
| NaOH | 0.83 | | | | | | | |
| | 0.50 | | | | | | | >24 hours |
| KOH | 0.01 | | | | | | | >24 hours |
| | 0.01 | | | | | | | >24 hours |
| LiOH | 0.10 | | | | | | | >24 hours |
| | 0.09 | | | | | | | >24 hours |
| Na Formate | 0.83 | | | | | | | |
| | 0.42 | | | | | | | >24 hours |
| Na Propionate | 0.83 | | | | | | | |
| | 0.42 | | | | | | | >24 hours |
| Li Acetate | 0.83 | | | | | | | |
| | 0.57 | | | | | | | >24 hours |
| Tetra Phenyl Phosphonium Phenolate | 0.21 | | | | | | | |
| | 0.10 | | | | | | | |
| | 0.09 | | | | | | | >24 hours |
| | 0.08 | | | | | | | >24 hours |
| CS-Acetate | 0.83 | | | | | | | |
| | 0.79 | | | | | | | >24 hours |

DISCUSSION

The examples demonstrate that it is possible to add various reaction components and additives in the form of solutions in ester-substituted phenol compounds. The influence of both the additives and their carrier liquids can have when added to a polymerization process were also investigated. By adding the additive dissolved or suspended in an ester-substituted phenol it is possible to prevent the interference of a carrier liquid containing a foreign material (e.g. water) with the polymerization process. Since ester-substituted phenol (e.g. MS) is already present at relatively high concentrations in the polymerization reaction, because of the use of an ester-substituted diaryl carbonate (e.g. bismethylsalicylcarbonate) as the carbonate source, no interference from this carrier liquid is seen in the polymerization reaction.

As shown in working examples 1, 2, 4, and 6-8, it is possible to add reaction components and additives like BMSC, BPA, and PCP to a melt polymerization process by injecting a solution of these compounds in MS during the course of the polymerization. It is demonstrated that a systematic change in the measured molecular weight of the polymer product and thus a corresponding systematic change in torque as measured on the extruder is observed by the addition of the monomers in ester-substituted phenol. Therefore it is demonstrated that a late of addition of a monomer in MS solution together with a torque or other measurement can provide a feedback loop for a controlled adjustment or maintenance of molecular weight during a polymerization run. The addition of BPA may, at least temporarily, cause a formation of free OH end groups, which are often associated with color formation. Therefore it may be preferred to run somewhat high in molecular weight during production runs and then to correct the molecular weight downward by addition of BMSC. No negative influence was seen on the final polymer product with regard to polymer color or levels of residual compounds or melt byproducts (e.g. Salicyl-OH and/or fries rearrangement) in these examples.

The examples also indicate that when working with some additives, especially those containing free OH groups, one must be careful to avoid exposing the solution of component/agent in ester-substituted phenol to elevated temperatures for long periods of time. Otherwise undesired transesterification reactions or degradation may occur.

It is also shown in examples 3, 5, and 9 that a variety of organic low molecular weight alcohols or acids or DMSO may be used as co-solvents with ester-substituted phenol in order to create appropriate liquid catalyst systems. A variety of inorganic and organic transesterification catalysts may be dissolved in such catalyst solvent systems. In general, since the co-solvent is only used at relatively quite low concentrations in the polymerization reaction and because the ester-substituted phenolic byproduct is the bulk of the liquid catalyst system, no interference from this co-solvent is seen in the polymerization reaction. The use of low molecular weight alcohols such as methanol do not give appreciable color formation or decreases in molecular weight; however, they do give an increase in the relative amount of alkyl carbonate versus alkyl ether end groups observable in the proton NMR spectra of the resulting polymer (e.g. methyl carbonate versus methyl ether when methanol is used as co-solvent). For example, the molar ratio alkyl carbonate/alkyl ether is typically greater than about 5 when MeOH is used as a co-solvent. Of course, if an alkyl alcohol other than methanol is used as co-solvent, then new features will be observable in the NMR spectra due to the new alkyl carbonate end group introduced (e.g. ethyl carbonate when ethanol is used, or propyl carbonate when propanol is used). Alternatively, if methanol is used as co-solvent but another ester-substituted diaryl carbonate such as bis(ethyl salicyl)carbonate or bis(propyl salicyl)carbonate is used, then the methyl carbonate groups would result only from the use of the co-solvent and not from the carbonate or its phenolic byproduct. The use of low molecular weight organic acids may give some color formation or molecular weight reduction when used at high levels (e.g. 14.4 mole % or more relative to BMSC), and they introduce a new alkyl ester end group observable in the proton NMR spectra of the resulting polymer (e.g. acetate ester when acetic acid is used as co-solvent). The use of DMSO as co-solvent gives significant color formation and observable smell, and several new features are observable in the proton NMR spectra of the resulting polymer.

The invention claimed is:

1. A method of forming polycarbonate comprising the steps of:
   (I) introducing a plurality of reaction components to a reactor operating under melt polymerization conditions, the plurality of reaction components comprising a dihydroxy compound, an ester-substituted diaryl carbonate, and a melt transesterification catalyst, wherein:
       the reaction components are introduced in a plurality of reaction component streams,
       a first reaction component streams comprises a melt transesterification catalyst dissolved or suspended in a liquid carrier comprising an ester-substituted phenol, wherein the composition of the first reaction component stream is selected such that ester-substituted phenol is not generated as a reaction product in the first reaction component stream, and
   (II) removing ester-substituted phenol from the reactor, thereby allowing the reaction components to react to form polycarbonate.

2. The method of claim 1, wherein the first reaction component stream comprises between 0.0001 and 3.0000 wt. % catalyst and between 97.0000 wt. % and 99.9999 wt. % ester-substituted phenol.

3. The method of claim 1, wherein the first reaction component stream further comprises a polar protic co-solvent.

4. The method of claim 3, wherein the polar protic co-solvent is present in a ratio of 0.1 to 50.0 wt % polar protic co-solvent to 50.0 to 99.9 wt % ester-substituted phenol.

5. The method of claim 3, wherein the polar protic co-solvent is selected from the group consisting of methanol, ethanol, formic acid, and acetic acid.

6. The method of claim 1, wherein the reaction components in the first reaction component stream further comprise a dihydroxy compound.

7. The method of claim 6, wherein the first reaction component stream comprises between 0.0001 and 3.0000 wt. % catalyst, between 1.0000 and 10.0000 wt. % dihydroxy compound, and between 87.0000 and 98.9999 wt. % ester-substituted phenol.

8. The method of claim 1, wherein the reaction components in the first reaction component stream further comprise an ester-substituted diaryl carbonate.

9. The method of claim 8, wherein the first reaction component stream comprises between 0.0001 and 3.0000 wt. % catalyst, between 1.0000 and 50.0000 wt. % ester-substituted diaryl carbonate, and between 47.0000 and 98.9999 wt. % ester-substituted phenol.

10. The method of claim 1, wherein the ester-substituted diaryl carbonate comprises bismethylsalicylcarbonate and the ester-substituted phenol comprises methyl salicylate.

11. The method of claim 1, wherein a second reaction component streams comprises an ester-substituted diaryl carbonate, a dihydroxy compound, or both an ester-substituted diaryl carbonate and a dihydroxy compound dissolved or suspended in a carrier liquid comprising an ester-substituted phenol, wherein the composition of the second reaction component stream is selected such that ester-substituted phenol is not generated as a reaction product in the second reaction component stream.

12. The method of claim 11, wherein the reaction components in the first reaction component stream comprise a melt transesterification catalyst and a dihydroxy compound, and wherein the reaction component in the second reaction component stream comprises an ester-substituted diaryl carbonate.

13. The method of claim 11, wherein the reaction components in the first reaction component stream comprise a melt transesterification catalyst and an ester-substituted diaryl carbonate, and wherein the reaction component in the second reaction component stream comprises a dihydroxy compound.

14. The method of claim 11, wherein the reaction component in the first reaction component stream comprises a melt transesterification catalyst and wherein the reaction components in the second reaction component stream comprise a dihydroxy compound and an ester-substituted diaryl carbonate.

15. The method of claim 1, wherein the method further comprises the step of:
    introducing a reaction agent additive stream to the plurality of reaction components in the reactor, wherein the additive stream comprises a reaction agent additive dissolved or suspended in an ester-substituted phenol.

16. The method of claim 15, wherein the reaction agent additive is selected from the group consisting of antioxidants, branching agents, and end-capping agents.

17. The method of claim 1, wherein the method further comprises the steps of:
    introducing a processing agent additive stream to the polycarbonate, wherein the processing agent additive stream comprises a processing agent additive dissolved or suspended in an ester-substituted phenol,
    and blending the polycarbonate with the processing agent additive to produce a polycarbonate further comprising a processing agent additive.

18. The method of claim 17, wherein the processing agent additive is selected from the group consisting of impact modifiers, colorants, mold release agents, fire retardants, and UV stabilizers.

19. A method of forming polycarbonate comprising the steps of:
(I) introducing a plurality of reaction components to a reactor operating under melt polymerization conditions, the plurality of reaction components comprising a dihydroxy compound, an ester-substituted diaryl carbonate, and a melt transesterification catalyst, wherein:
the reaction components are introduced in a plurality of reaction component streams,
a first reaction component streams comprises an ester-substituted diaryl carbonate, a dihydroxy compound, or both an ester-substituted diaryl carbonate and a dihydroxy compound dissolved or suspended in a carrier liquid comprising an ester-substituted phenol, wherein the composition of the first reaction component stream is selected such that ester-substituted phenol is not generated as a reaction product in the first reaction component stream, and
(II) removing ester-substituted phenol from the reactor, thereby allowing the reaction components to react to form polycarbonate.

20. The method of claim 19, wherein the reaction components further comprise a polycarbonate oligomer.

21. The method of claim 19, wherein the reaction component in the first reaction component stream comprises a dihydroxy compound.

22. The method of claim 21, wherein the first reaction component stream comprises between 1.0 wt. % and 10.0 wt. % dihydroxy compound, and between 90.0 wt. % and 99.0 wt. % ester-substituted phenol.

23. The method of claim 21, wherein the reaction components in the first reaction component stream further comprises a ester-substituted diaryl carbonate.

24. The method of claim 23, wherein the first reaction component stream comprises between 1.0 wt. % and 10.0 wt. % dihydroxy compound, between 1.0 and 50.0 wt. % ester-substituted diaryl carbonate, and between 40.0 wt. % and 98.0 wt. % ester-substituted phenol.

25. The method of claim 19, wherein the reaction component in the first reaction component stream comprises an ester-substituted diaryl carbonate.

26. The method of claim 25, wherein the first reaction component stream comprises between 1.0 and 50.0 wt. % ester-substituted diaryl carbonate, and between 50.0 wt. % and 99.0 wt. % ester-substituted phenol.

27. The method of claim 19, wherein the method further comprises the step of:
introducing a reaction agent additive stream to the plurality of reaction components in the reactor, wherein the reaction agent additive stream comprises a reaction agent additive dissolved or suspended in an ester-substituted phenol.

28. The method of claim 19, wherein the method further comprises the steps of:
introducing a processing agent additive stream to the polycarbonate, wherein the processing agent additive stream comprises a processing agent additive dissolved or suspended in an ester-substituted phenol,
and blending the polycarbonate with the processing agent additive to produce a polycarbonate further comprising a processing agent additive.

29. A method of forming polycarbonate comprising the steps of:
(I) introducing a plurality of reaction components to a reactor operating under melt polymerization conditions, the plurality of reaction components comprising a dihydroxy compound, an ester-substituted diaryl carbonate, and a melt transesterification catalyst,
(II) introducing a reaction agent additive stream to the plurality of reaction components in the reactor, wherein the reaction agent additive stream comprises a reaction agent additive dissolved or suspended in an ester-substituted phenol, and
(III) removing ester-substituted phenol from the reactor, thereby allowing the reaction components to react to form polycarbonate.

* * * * *